(12) United States Patent
Rahman et al.

(10) Patent No.: US 9,629,194 B2
(45) Date of Patent: Apr. 18, 2017

(54) ASSIGNMENT OF COMPONENT CARRIERS IN DUAL CONNECTIVITY OPERATION

(71) Applicants: Imadur Rahman, Sollentuna (SE); Muhammad Kazmi, Bromma (SE)

(72) Inventors: Imadur Rahman, Sollentuna (SE); Muhammad Kazmi, Bromma (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 14/708,750

(22) Filed: May 11, 2015

(65) Prior Publication Data
US 2015/0334764 A1 Nov. 19, 2015

Related U.S. Application Data

(60) Provisional application No. 61/993,827, filed on May 15, 2014.

(51) Int. Cl.
*H04W 36/00* (2009.01)
*H04W 76/02* (2009.01)
(Continued)

(52) U.S. Cl.
CPC .......... *H04W 76/025* (2013.01); *H04L 5/001* (2013.01); *H04L 5/0092* (2013.01); *H04W 16/14* (2013.01);
(Continued)

(58) Field of Classification Search
USPC ......................................................... 370/328
See application file for complete search history.

(56) References Cited

U.S. PATENT DOCUMENTS 9,392,481 B2 7/2016 Sun et al.
2010/0267394 A1* 10/2010 Wu ..................... H04W 24/10
455/450

(Continued)

FOREIGN PATENT DOCUMENTS

WO WO 2013/075314 A1 5/2013

OTHER PUBLICATIONS

PCT Notification of Transmittal of the International Search Report and the Written Opinion of the International Searching Authority, or the Declaration for International application No. PCT/IB2015/053466, Aug. 17, 2015.
3GPP TSG-RAN WG2 Meeting #85; Prague, Czech Republic; Source: NSN, Nokia Corporation; Title: Discussion on split of UE capabilities for Dual Connectivity (R2-140373), Feb. 10-14, 2014.
3GPP TSG-RAN WG1 #76; Shenzhen, P.R. China; Source: NEC; Title: On UE capabilities defined as UE category for dual connectivity (R1-141205), Mar. 31, 2014.

(Continued)

*Primary Examiner* — Edan Orgad
*Assistant Examiner* — Sithu Ko
(74) *Attorney, Agent, or Firm* — Baker Botts, LLP

(57) ABSTRACT

A method comprises obtaining component carrier information for a user equipment, the component carrier information comprising information about one or more component carriers currently configured at the user equipment for dual connectivity operation, and obtaining capability information for the user equipment, the capability information comprising information about a maximum number of component carriers that the user equipment can use for dual connectivity operation. The method comprises configuring one or more component carriers at the user equipment such that a total number of component carriers configured at the user equipment does not exceed the maximum number of component carriers that the user equipment can use for dual connectivity operation, the one or more component carriers configured according to one or more predefined rules and based at least in part on one or more of the component carrier information for the user equipment and the capability information for the user equipment.

34 Claims, 10 Drawing Sheets

(51) Int. Cl.
*H04W 24/02* (2009.01)
*H04W 16/14* (2009.01)
*H04L 5/00* (2006.01)
*H04W 72/04* (2009.01)
*H04W 76/04* (2009.01)

(52) U.S. Cl.
CPC ....... *H04W 24/02* (2013.01); *H04W 72/0406* (2013.01); *H04W 76/04* (2013.01)

(56) References Cited

U.S. PATENT DOCUMENTS

| | | | |
|---|---|---|---|
| 2011/0103243 | A1 | 5/2011 | Larsson et al. |
| 2011/0256858 | A1 | 10/2011 | Wu |
| 2012/0044910 | A1 | 2/2012 | Maeda et al. |
| 2012/0087257 | A1 | 4/2012 | Larsson et al. |
| 2012/0155272 | A1* | 6/2012 | Quan ............... H04L 5/003 370/235 |
| 2013/0170470 | A1 | 7/2013 | Kneckt et al. |
| 2015/0043479 | A1* | 2/2015 | Kitazoe ............ H04W 72/044 370/329 |
| 2015/0215826 | A1* | 7/2015 | Yamada ........... H04W 36/0072 455/436 |
| 2015/0230236 | A1* | 8/2015 | Zeng ............... H04L 41/0806 370/329 |
| 2015/0319753 | A1 | 11/2015 | Chen et al. |
| 2016/0081062 | A1 | 3/2016 | Wei |
| 2016/0337834 | A1 | 11/2016 | Harrington |

OTHER PUBLICATIONS

3GPP TSG-RAN WG2 #85bis; Valencia, Spain; Source: Ericsson; Title: Handling of RRC containers and UE capabilities (Tdoc R2-141530), Mar. 31-Apr. 4, 2014.
3GPP TSG RAN WG1 #76bis; Shenzhen, China; Source: Qualcomm Incorporated; Title: Physical layer aspects for dual connectivity (R1-141444), Mar. 31-Apr. 4, 2014.
3GPP TSG RAN WG2 Meeting #85bis; Valencia, Spain; Source: Samsung; Title: L1 UE capability handling for dual connectivity (R2-141752), Mar. 31-Apr. 4, 2014.
Office Action of the Intellectual Property Office of the ROC (Taiwan) for Patent Application No. 104115651—May 23, 2016.
PCT Notification of Transmittal of the International Search Report and the Written Opinion of the International Searching Authority, or the Declaration with attached International Search Report and Written Opinion of the International Searching Authority for PCT/IB2015/053465 dated Oct. 14, 2015.
Ericsson "Handling of RRC Containers and UE Capabilities" Tdoc R2-141530, 3GGP, Mar. 31, 2014.
Huawei, HiSilicon, "Handling of UE Capabilities in Dual Connectivity" R2-141167, 3GGP, Mar. 31, 2014.
NEC, "On UE Capabilities Defined as UE category for dual Connectivity" R1-141205, 3GGP, Mar. 4, 2014.
Intel Corporation "UE Capability Handling Dual Connectivity" R2-141174, 3GGP, Mar. 31, 2014.
Ericsson "RLF Handling in Dual Connectivity" Tdoc R2-140655, 3GGP, Feb. 10, 2014.

* cited by examiner

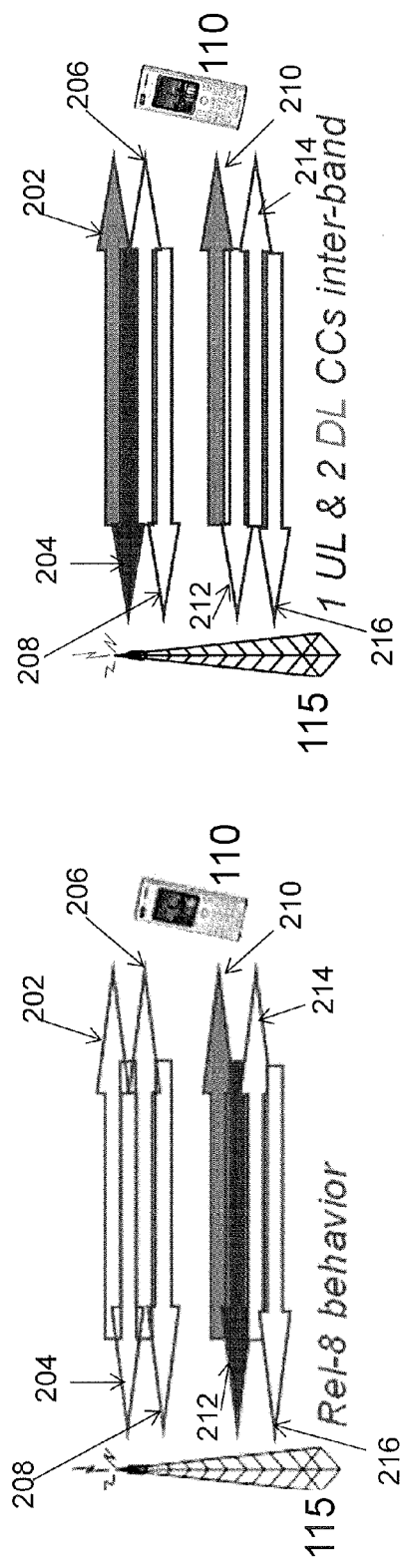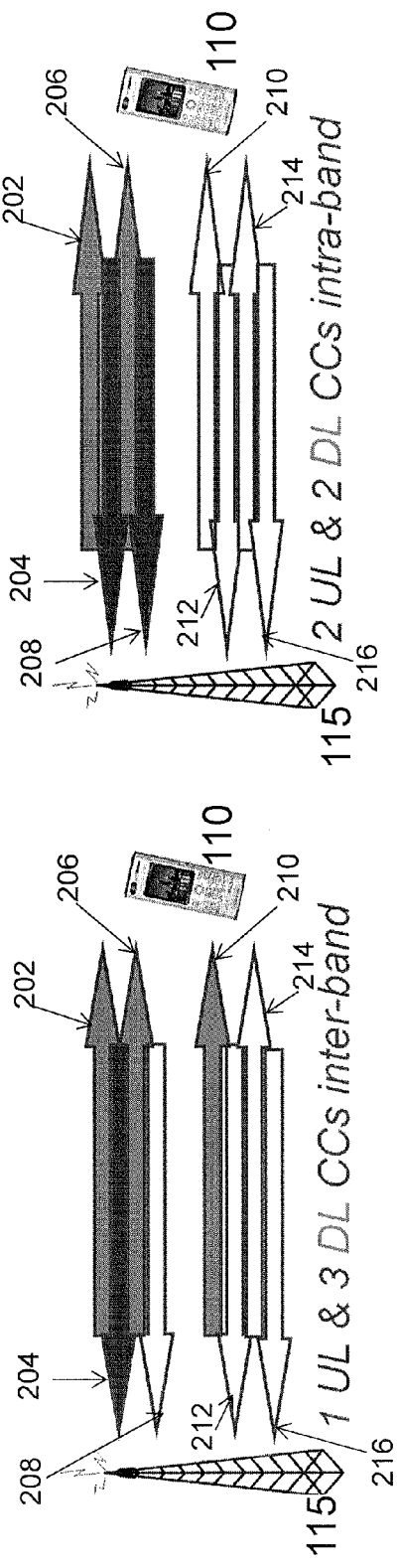

US 9,629,194 B2

ASSIGNMENT OF COMPONENT CARRIERS IN DUAL CONNECTIVITY OPERATION

PRIORITY

This application claims the benefit under 35 U.S.C. §119(e) of the priority of U.S. Provisional Application 61/993,827 filed on May 15, 2014, entitled "Assignment of Component Carriers in Dual Connectivity Operation," the entire disclosure of which is hereby incorporated by reference.

TECHNICAL FIELD

The present disclosure relates, in general, to wireless communications and, more particularly, to methods and systems for assignment of component carriers in dual connectivity operation.

BACKGROUND

Dual Connectivity (DC) refers to the operation in which a given user equipment (UE) consumes radio resources provided by at least two different network points (such as, for example, a Master eNodeB (MeNB) and Secondary eNodeB (SeNB)) connected with non-ideal backhaul while in RRC CONNECTED. A UE in DC maintains simultaneous connections to the MeNB (often, the anchor node) and the SeNB (often, the booster node). The MeNB controls the connection and handover of SeNB. No SeNB standalone handover is defined for Rel-12. Signaling in MeNB is needed when the SeNB changes. Both the MeNB and SeNB can terminate the control plane connection towards the UE, and can thus be the controlling nodes of the UE. The UE reads system information from the MeNB. In addition to the MeNB, the UE may be connected to one or several SeNBs for added user plane support. The MeNB and SeNB are connected via the Xn interface, which is currently selected to be the same as the X2 interface between two eNBs.

FIG. 1A is a schematic diagram of a system under a dual connectivity operation. More particularly, FIG. 1A illustrates one or more UEs 110A, 110B, and 110C, and one or more network nodes 115A, 115B, and 115C. Network node 115A may be an MeNB, and network node 115B may be an SeNB. UE 110A may be connected to only MeNB 115A, while UE 110B may be connected to both MeNB 115A and SeNB 115B. UE 110C may be connected to network node 115C. Although FIG. 1A illustrates only one SeNB 115B connected to UE 110B, in certain embodiments more than one SeNB can serve UE 110B. Typically, a UE, such as UE 110B, may be configured with at least a primary component carrier (PCC) from MeNB 115A and a PCC from SeNB 115B. The primary serving cells on PCCs from MeNB 115A and SeNB 115B are generally called a primary cell (PCell) and a primary secondary cell (PSCell), respectively. UE 110B may also be configured with one or more secondary component carriers (SCCs) from MeNB 115A and SeNB 115B. The serving cell on SCC is called a secondary serving cell (SCell). Often, the PCell and PSCell operate or serve the UE independently.

FIG. 1B is a schematic diagram of a system under a dual connectivity operation. More particularly, FIG. 1B illustrates a pair of network nodes 115A and 115B. Network node 115A may be an MeNB, and network node 115B may be an SeNB. FIG. 1B also illustrates two UEs 110D and 110E. UE 110D may be a DC capable UE, and UE 110E may be a legacy UE. DC is a UE-specific feature. Thus, a network node can support a dual connected UE and a legacy UE at the same time. For example, SeNB 115B may support UE 110D using dual connectivity operation and legacy UE 110E at the same time.

As described above, the roles of MeNB 115A and SeNB 115B are defined from a UE perspective, which means that a network node that acts as an MeNB to one UE may act as an SeNB to another UE. Similarly, though the UE reads the system information from the anchor node (i.e., MeNB 115A), a node acting as a booster (i.e., SeNB 115B) to one UE, may or may not distribute system information to another UE. The MeNB and SeNB may perform a variety of functions. For example, MeNB 115A may provide system information, terminate the control plane, and can terminate the user plane. SeNB 115B can terminate the control plane or terminate only the user plane.

In one application, DC allows a UE to be connected to two network nodes to receive data from both network nodes to increase its data rate. This user plane aggregation achieves similar benefits as carrier aggregation using network nodes that are not connected by a low-latency backhaul/network connection. Due to this lack of low-latency backhaul, the scheduling and HARQ-ACK feedback from the UE to each of the network nodes will need to be performed separately. That is, it is expected that the UE shall have two UL transmitters to transmit UL control and data to the connected network nodes. In light of this, DC becomes a special case of carrier aggregation. Carrier aggregation is one of the ways of increasing the per user throughput for users with good channel conditions and with the capability of receiving and transmitting at higher data rate. A user can be configured to two or three (or more) simultaneous bands in downlink (DL) and/or in uplink (UL).

FIG. 2A is a schematic diagram of a network node 115 that is capable of running four different cells at the same time. Each arrow 202-216 represents a cell in either the UL or DL. For example, arrows 202, 206, 210, and 214 are in the DL, and arrows 204, 208, 212, and 216 are in the UL. These cells may be operated in different bands, or they may be operated in the same band. In Release 8, for example, and as shown in FIG. 2A, only one cell is used for communication between network node 115 and UE 110, as shown by adjacent shaded arrow 210 in the DL and arrow 212 in the UL.

In carrier aggregation terms, the cell where UL is allocated for a UE 110 is the primary cell (PCell), while the other aggregated cell is the secondary cell (SCell). PCell and SCell combinations are UE specific. Other carrier aggregation cases based on the number of CCs in DL and/or UL may exist. Examples of these cases are described in more detail below.

FIG. 2B is a schematic diagram of a network node 115 running two cells activated for one user equipment 110. More particularly, FIG. 2B illustrates a version of DL carrier aggregation with two DL CCs 202, 210, and one UL CC 204. As shown in FIG. 2B, UE 110 is configured to receive in 2 DL bands simultaneously, while still using UL in only one of the bands. The UL allocation in this case is arbitrary, meaning that either of the bands (e.g., 204 or 212) can be used for UL transmission.

FIG. 2C is a schematic diagram showing a network node 115 running three downlink bands allocated to a user equipment 110. More particularly, FIG. 2C illustrates a version of DL carrier aggregation with three downlink CCs 202, 206, 210, and one UL CC 204. Similar to the two DL CC configuration described above in relation to FIG. 2B, the UL can be allocated to any of the bands (e.g., 204, 208, 212). In some cases, a second UL CC could be allocated to UE 110.

FIG. 2D is a schematic diagram showing a network node 115 running uplink carrier aggregation. More particularly, FIG. 2D illustrates a version of UL carrier aggregation with two UL CCs 204, 208, and two DL CCs 202, 206. In the case of UL carrier aggregation, PCell and SCell definitions are still UE specific.

Depending on the carrier frequency, or depending on the physical eNB deployment, the deployment of a carrier aggregation-enabled system can be very different. Some example carrier aggregation deployment scenarios are described in more detail below in relation to FIGS. 3A and 3B.

FIG. 3A is a schematic diagram showing an example carrier aggregation deployment scenario. More particularly, FIG. 3A shows that frequency 1 (F1) and frequency 2 (F2) cells are co-located and overlaid, but F2 has smaller coverage due to larger path loss. Only F1 provides sufficient coverage, and F2 is used to improve throughput. Mobility is performed based on F1 coverage. As an example scenario, F1 and F2 are of different bands, e.g., F1={800 MHz, 2 GHz} and F2={3.5 GHz}, etc. It is expected that aggregation is possible between overlaid F1 and F2 cells.

FIG. 3B is a schematic diagram showing another example carrier aggregation deployment scenario. In FIG. 3B, F1 provides macro coverage, and on F2 Remote Radio Heads (RRHs) are used to improve throughput at hot spots. Mobility is performed based on F1 coverage. In such a scenario, it is likely that F1 and F2 are of different bands, e.g., F1={800 MHz, 2 GHz} and F2={3.5 GHz}, etc. It is expected that F2 RRHs cells can be aggregated with the underlying F1 macro cells.

One consideration in dual connectivity operation is the capability of a particular UE. UEs may be capable of supporting certain number of CCs, based on the UE RF architecture. For example, the maximum number of CCs that a UE can support may be 5. During connection setup, the UE reports its capability to the network. The MeNB and SeNB(s) configure the UE independently regarding the number CCs from MeNB and SeNB(s). A UE can handle a maximum of 5 CCs while connected to arbitrary number of nodes. The limit on the number of CCS is set by UE capability. That is, the UE supports 2, 3, 4, or 5 CCs. When MeNB and SeNB configure the UE independently, there is a possibility that the total number of CC requests may become higher than the limit. The individual node (MeNB and SeNB) may not know the current total number of CCs that the UE is configured with. When MeNB and SeNB have little coordination between them, then there is a possibility that the nodes may configure the UE to handle CCs that the UE cannot handle. Thus, there is a need for an improved method of configuring CCs for UEs in DC operation.

SUMMARY

To address the foregoing problems with existing solutions, disclosed is a method in a network node. The method comprises obtaining component carrier information for a user equipment, the component carrier information comprising information about one or more component carriers currently configured at the user equipment for dual connectivity operation, and obtaining capability information for the user equipment, the capability information comprising information about a maximum number of component carriers that the user equipment can use for dual connectivity operation. The method further comprises configuring one or more component carriers at the user equipment such that a total number of component carriers configured at the user equipment does not exceed the maximum number of component carriers that the user equipment can use for dual connectivity operation, the one or more component carriers configured according to one or more predefined rules and based at least in part on one or more of the component carrier information for the user equipment and the capability information for the user equipment.

In certain embodiments, the one or more predefined rules may define a proportion of the maximum number of component carriers that the user equipment can use for dual connectivity operation that may be configured by the network node, and configuring the one or more component carriers at the user equipment may comprise configuring one or more component carriers up to the predefined proportion of the maximum number of component carriers that the user equipment can use for dual connectivity operation. The proportion of the maximum number of component carriers may be a first proportion, and the one or more predefined rules may define a second proportion of the maximum number of component carriers that the user equipment can use for dual connectivity operation that may be assigned by a second network node.

In certain embodiments, the network node may be a first network node, the one or more predefined rules may define a minimum number of component carriers that may be configured by the first network node and a minimum number of component carriers that may be configured by a second network node, and configuring one or more component carriers at the user equipment such that the total number of component carriers configured at the user equipment does not exceed the maximum number of component carriers that the user equipment can use for dual connectivity operation may comprise configuring, by the first network node, the minimum number of component carriers that may be assigned by the first network node. In certain embodiments, a total of the minimum number of component carriers that may be configured by the first network node and the minimum number of component carriers that may be configured by the second network node may be less than the maximum number of component carriers that the user equipment can use for dual connectivity operation, the one or more predefined rules may further comprise that the first network node has priority for component carriers to be configured in addition to the minimum number of component carriers that may be configured by the first network node and the minimum number of component carriers that may be configured by the second network node, and the method may further comprise configuring, by the first network node, additional component carriers beyond the minimum number of component carriers. In certain embodiments, a total of the minimum number of component carriers that may be configured by the first network node and the minimum number of component carriers that may be configured by the second network node may be less than the maximum number of component carriers that the user equipment can use for dual connectivity operation, the one or more predefined rules may further comprise prioritizing component carriers to be configured in addition to the minimum number of component carriers that may be configured by the first network node and the minimum number of component carriers that may be configured by the second network node on a first come first serve basis, and the method may further comprise configuring, by the first network node, additional component carriers beyond the minimum number of component carriers if the first network node requests that an additional component carrier be configured before the second network node.

In certain embodiments, the network node may be a first network node, the one or more predefined rules may define a number of component carriers that may be assigned by the first network node and a number of component carriers that may be assigned by a second network node, and the method may further comprise assigning each of the component carriers a priority level, wherein each of the component carriers may be accepted or deconfigured by the user equipment based at least in part on the priority level of the component carriers. The priority level of each of the component carriers may be assigned based on one or more of: a random assignment; a frequency range of each component carrier; a frequency band of each component carrier; a load of each component carrier; and a usage of each component carrier. The one or more predefined rules may define a number of component carriers that may be assigned by the first network node and a number of component carriers that may be assigned by the second network node, and component carriers in addition to the number of component carriers that may be configured by the first network node and the number of component carriers that may be configured by the second network node may be configured at the user equipment according to the assigned priorities.

In certain embodiments, the method may further comprise communicating, to a second network node, one or more component carrier configuration parameters, the one or more component carrier configuration parameters may comprise one or more of: a maximum number of component carriers that the user equipment can use for dual connectivity operation; a proportion of the maximum number of component carriers that the network node may configure for the user equipment for dual connectivity operation; a proportion of the maximum number of component carriers that a second network node may configure for the user equipment for dual connectivity operation; a minimum number of component carriers that may be assigned by the first network node; a minimum number of component carriers that may be assigned by the second network node; and a priority level assigned to a particular component carrier.

In certain embodiments, the method may further comprise receiving, from the user equipment, one or more component carrier configuration parameters, the one or more component carrier configuration parameters may comprise one or more of: a maximum number of component carriers that the user equipment can use for dual connectivity operation; a proportion of the maximum number of component carriers that the network node may configure for the user equipment for dual connectivity operation; a proportion of the maximum number of component carriers that a second network node may configure for the user equipment for dual connectivity operation; a minimum number of component carriers that may be assigned by the first network node; a minimum number of component carriers that may be assigned by the second network node; and a priority level assigned to a particular component carrier.

In certain embodiments, the method may further comprise receiving, from a second network node, one or more component carrier configuration parameters, the one or more component carrier configuration parameters may comprise one or more of: a maximum number of component carriers that the user equipment can use for dual connectivity operation; a proportion of the maximum number of component carriers that the network node may configure for the user equipment for dual connectivity operation; a proportion of the maximum number of component carriers that a second network node may configure for the user equipment for dual connectivity operation; a minimum number of component carriers that may be assigned by the first network node; a minimum number of component carriers that may be assigned by the second network node; and a priority level assigned to a particular component carrier.

In certain embodiments, the method may further comprise communicating, to a second network node, a recommended value for a particular component carrier configuration parameter, and determining a common value for the particular component carrier configuration parameter based on a predefined rule. In certain embodiments, the network node may be a Master eNodeB (MeNB); and the method may further comprise communicating one or more component carrier configuration parameters to a second network node, the second network node comprising a secondary eNodeB (SeNB). The method may further comprise receiving one or more component carrier configuration parameters from a third network node. The method may further comprise communicating, to a second network node, the obtained component carrier information about one or more component carriers currently configured at the user equipment. The method may further comprise permitting a second network node to configure component carriers at the user equipment. The method may further comprise receiving an indication that a request to configure a component carrier at the user equipment has been denied.

Also disclosed is a network node. The network node comprises one or more processors. The one or more processors are configured to obtain component carrier information for a user equipment, the component carrier information comprising information about one or more component carriers currently configured at the user equipment for dual connectivity operation, and obtain capability information for the user equipment, the capability information comprising information about a maximum number of component carriers that the user equipment can use for dual connectivity operation. The one or more processors are configured to configure one or more component carriers at the user equipment such that a total number of component carriers configured at the user equipment does not exceed the maximum number of component carriers that the user equipment can use for dual connectivity operation, the one or more component carriers configured according to one or more predefined rules and based at least in part on one or more of the component carrier information for the user equipment and the capability information for the user equipment.

Also disclosed is a method in a user equipment. The method comprises receiving, from a network node, a request to configure a first component carrier at the user equipment for dual connectivity operation, and determining whether a total number of currently configured component carriers including the first component carrier associated with the request exceeds a threshold number of component carriers that the user equipment can use for dual connectivity operation. The method further comprises performing one or more component carrier related radio operations based at least in part on the determination of whether the total number of currently configured component carriers including the first component carrier associated with the request exceeds the threshold number of component carriers that the user equipment can use for dual connectivity operation.

In certain embodiments, performing one or more component carrier related radio operations may comprise upon determining that the total number of currently configured component carriers including the first component carrier associated with the request exceeds the threshold number of component carriers that the user equipment can use for dual connectivity operation, autonomously denying the request to configure the first component carrier. The method may further comprise communicating, to the network node, an indication that the request to configure the first component carrier at the user equipment for dual connectivity operation has been denied. The method may further comprise communicating, to a second network node, an indication that the request to configure the first component carrier at the user equipment for dual connectivity operation has been denied.

In certain embodiments, the network node may be a first network node having an associated first priority level, and the method may further comprise receiving, from a second network node, a request to configure a second component carrier at the user equipment for dual connectivity operation, the second network node having an associated second priority level, and determining whether the first network node or the second network node has a higher priority level. Performing one or more component carrier related radio operations may comprise upon determining that the first priority level associated with the first network node has the higher priority level, accepting the request to configure the first component carrier associated with the first network node. The method may further comprise upon determining that the first network node has the higher priority level, down prioritizing one or more requests to configure one or more component carriers from the second network node. The first priority level associated with the first network node and the second priority level associated with the second network node may be based at least in part on one or more of temporal fairness between the first network node and the second network node and a link quality. The first priority level associated with the first network node and the second priority level associated with the second network node may be assigned by a third network node. The method may further comprise receiving information about one or more of the first priority level associated with the first network node and the second priority level associated with the second network node. The method may further comprise accepting one or more requests from the second network node to configure a component carrier at the user equipment for dual connectivity operation, wherein a number of requests from the second network node that the user equipment may accept may be limited to a difference between the threshold number of component carriers that the user equipment can use for dual connectivity operation and a number of component carriers already configured by the first network node. The method may further comprise receiving a new component carrier configuration from the first network node having the higher priority level, and reducing a number of component carriers configured by the second network node for dual connectivity operation in response to receiving the new component carrier configuration from the first network node.

In certain embodiments, the user equipment may be configured with at least a primary component carrier associated with the first network node and one or more secondary component carriers associated with a second network node, and the method may further comprise determining that radio link performance cannot be maintained on the primary component carrier associated with the first network node, and replacing the primary component carrier associated with the first network node with one of the one or more secondary component carriers associated with the second network node. Determining that radio link performance cannot be maintained on the primary component carrier associated with the first network node may comprise detecting consecutive out of sync measurements on the primary component carrier associated with the first network node as part of radio link monitoring. The method may further comprise determining whether a signal quality of one or more component carriers configured by the first network node and the second network node is above an out-of-sync threshold, and serving component carriers from the first network node and the second network node only if both the signal quality of both the first network node and the second network node is above the out-of-sync threshold.

In certain embodiments, the network node may be a first network node, the request to configure the first component carrier may be a first request, and the first component carrier may have an associated first carrier aggregation type. The method may further comprise receiving, from a second network node, a second request to configure a second component carrier at the user equipment for dual connectivity operation, the second component carrier having an associated second carrier aggregation type. Performing one or more component carrier related radio operations may comprise accepting one or more of the first request to configure the first component carrier from the first network node and the second request to configure the second component carrier from the second network node based at least in part on one or more of the first carrier aggregation type and the second carrier aggregation type. The method may further comprise rejecting one or more of the first request to configure the first component carrier from the first network node and the second request to configure the second component carrier from the second network node based at least in part on one or more of the first carrier aggregation type and the second carrier aggregation type. The first and second carrier aggregation types may comprise one of intra-band carrier aggregation or inter-band carrier aggregation.

In certain embodiments, the network node may be a first network node, the first component carrier may have an associated first priority level, and the method may further comprise receiving, from a second network node, a request to configure a second component carrier at the user equipment for dual connectivity operation, the second component carrier having an associated second priority level, determining whether the first component carrier or the second component carrier has the higher priority level, and upon determining that the first component carrier has the higher priority, accepting the request to configure the first component carrier at the user equipment from the first network node. The method may further comprise determining that the first component carrier has a higher priority than a previously configured component carrier, and upon determining that the first component carrier has a higher priority than the previously configured component carrier, replacing the previously configured component carrier with the first component carrier. The priority level of the first and second component carriers may be based on one or more of: a random assignment; a frequency range of each component carrier; a frequency band of each component carrier; a load of each component carrier; and a usage of each component carrier.

Also disclosed is a user equipment. The user equipment comprises one or more processors. The one or more processors are configured to receive, from a network node, a request to configure a first component carrier at the user equipment for dual connectivity operation, and determine whether a total number of currently configured component carriers including the first component carrier associated with the request exceeds a threshold number of component carriers that the user equipment can use for dual connectivity operation. The one or more processors are configured to perform one or more component carrier related radio operations based at least in part on the determination of whether the total number of currently configured component carriers including the first component carrier associated with the request exceeds the threshold number of component carriers that the user equipment can use for dual connectivity operation.

Certain embodiments of the present disclosure may provide one or more technical advantages. For example, in certain embodiments the component carrier configuration adaptation may ensure that the network configures the user equipment based on user equipment capability. As another example, the proposed embodiments may also provide that the most appropriate component carriers are configured for the user equipment. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 2A is a schematic diagram of a network node that is capable of running four different cells at the same time;

FIG. 2B is a schematic diagram of a network node running two cells activated for one user equipment;

FIG. 2C is a schematic diagram showing a network node running three downlink bands allocated to a user equipment;

FIG. 2D is a schematic diagram showing a network node running uplink carrier aggregation;

DETAILED DESCRIPTION

As described above, there may be a limit on the number of CCs that a UE can support. When an MeNB and an SeNB configure the UE independently, there is a possibility that the total number of CC requests may become higher than the limit. The individual node (MeNB and SeNB) may not know the current total number of CCs that the UE is configured with. When MeNB and SeNB have little coordination between them, then there is a possibility that the nodes may configure the UE to handle CCs that the UE cannot handle. Thus, there is a need for an improved method of configuring CCs for UEs.

The present disclosure contemplates various embodiments for allocating CCs by at least two different network nodes (e.g., an MeNB and an SeNB) at a UE for DC operation. The various embodiments described herein may ensure that the total number of configured CCs does not exceed a threshold (e.g., four CCs). The CC configuration may be done in any suitable manner. For example, in certain embodiments, a method of configuring CCs at the UE may be implemented by network nodes based on one or more of the following: network node implementation; UE autonomous action (e.g., down-prioritizing CC from certain node such as SeNB); based on a pre-defined rule (specified in the standard); and/or information or recommendation received from another network node.

In certain embodiments, the CC configuration at a UE for DC operation can be done by a network node (e.g. MeNB or SeNB). The network node may obtain information regarding currently configured CCs at the UE and/or obtain information about a total number of CCs that the UE can use for DC operation (e.g., based on UE capability, traffic requirements or buffer size, etc.). Based on the obtained information, the network node may configure one or more CCs at the UE.

A UE served by a network node (e.g., MeNB or SeNB) for DC operation may adapt the configured CCs or CCs being configured by a network node according to one or more rules. The UE may obtain information about CCs being configured and/or already configured by the network node for DC operation. The UE may accept or deny one or more CCs being configured, and/or de-configure one or more CCs already configured based on one more criteria. The criteria may be any suitable criteria, such as, for example, UE capability, one or more pre-defined rules, a priority level of the network node configuring the CC, and/or a priority level of CC, or any other suitable criteria.

The various embodiments described herein may have one or more advantages. For example, in certain embodiments the CC configuration adaptation may ensure that the network configures the UE based on UE capability. As another example, the proposed embodiments may provide that the most appropriate CCs are configured for the UE.

Figure 1A:
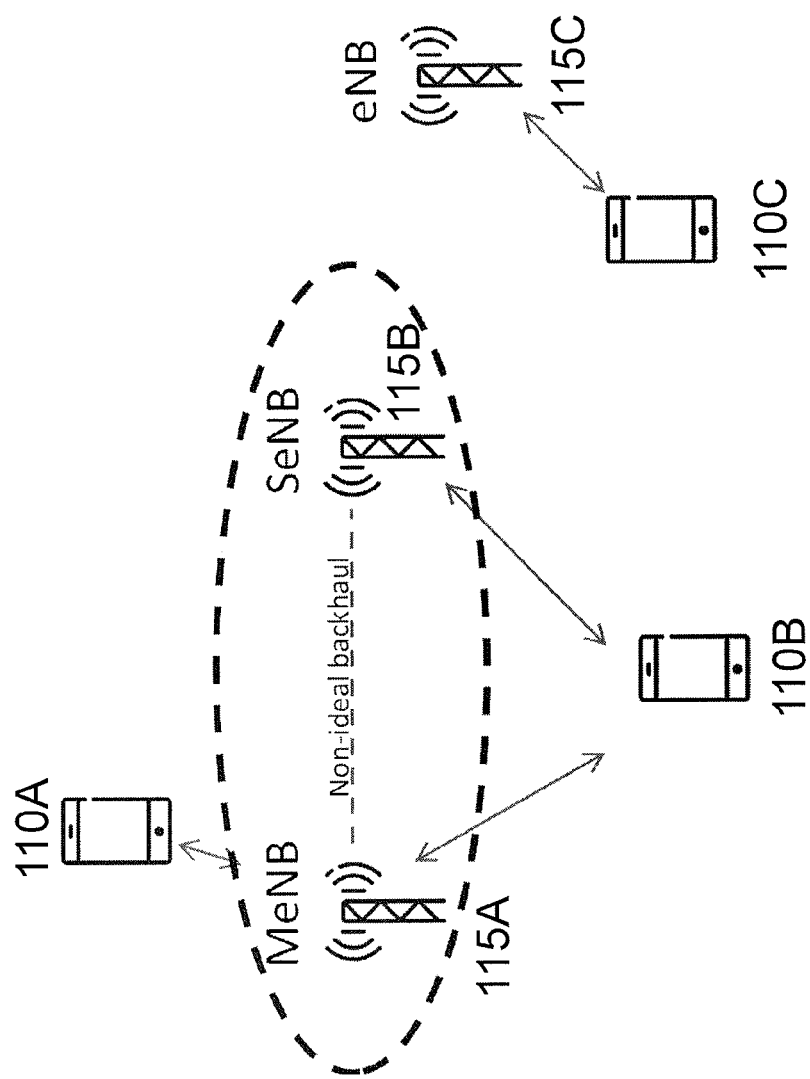
FIG. 1A is a schematic diagram of a system under a dual connectivity operation.
Figure 1B:
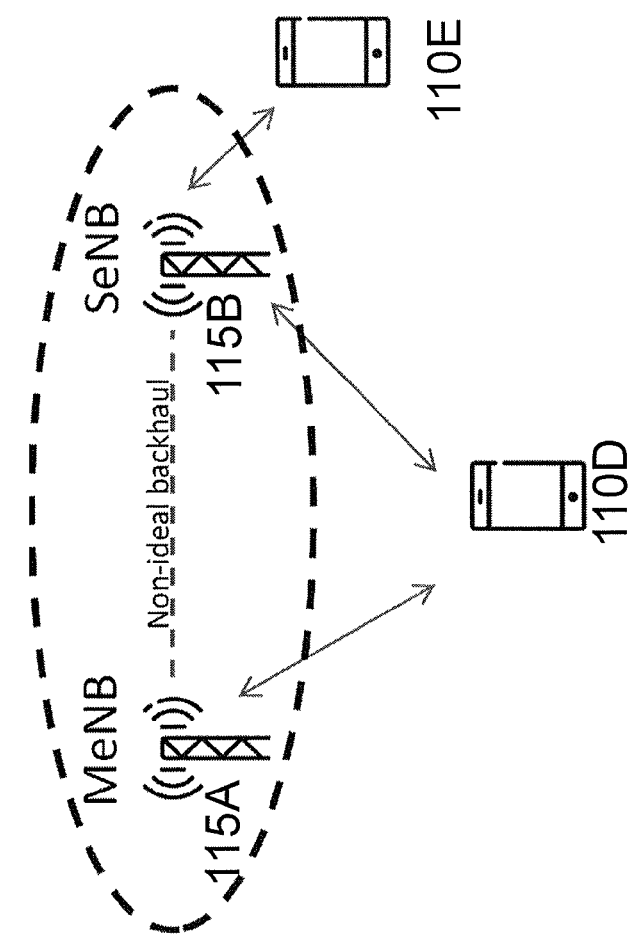
FIG. 1B is a schematic diagram of a system under a dual connectivity operation.
Figure 3A:
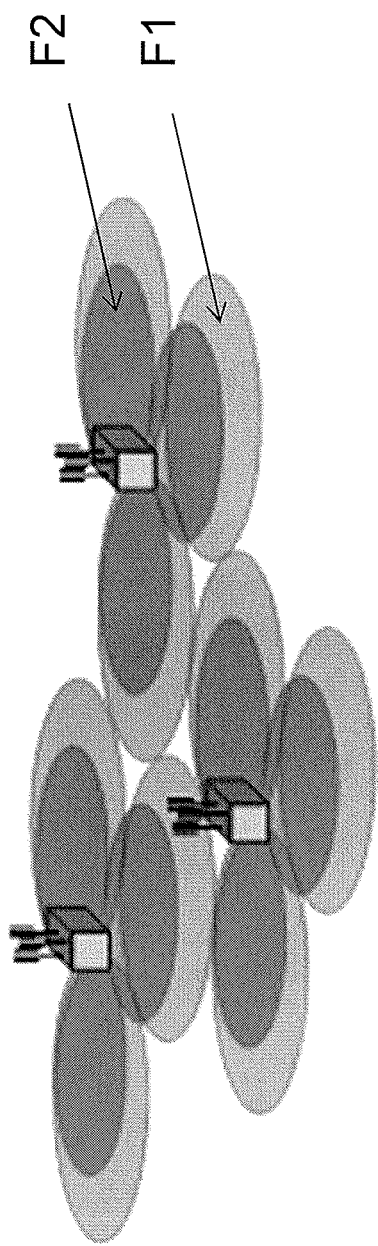
FIG. 3A is a schematic diagram showing an example carrier aggregation deployment scenario.
Figure 3B:
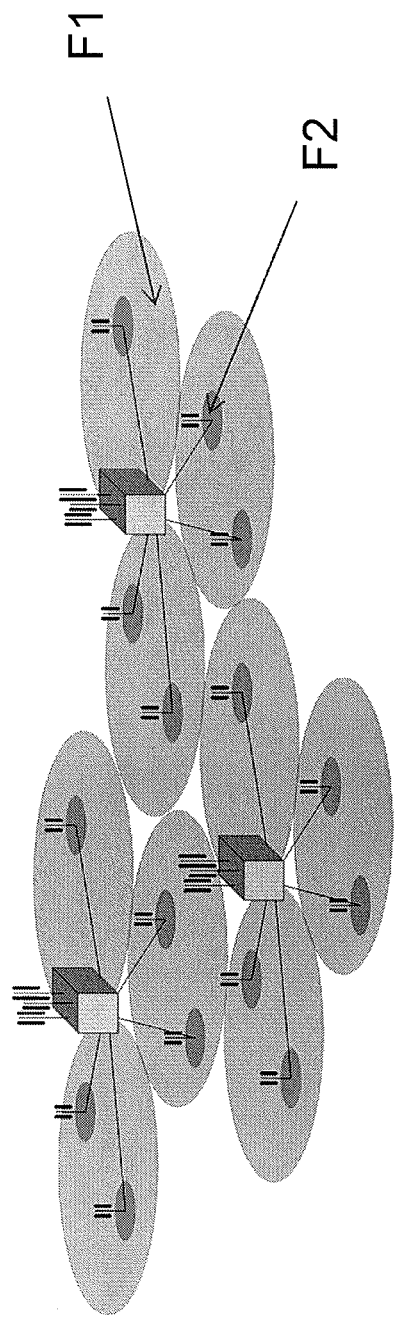
FIG. 3B is a schematic diagram showing another example carrier aggregation deployment scenario.
Figure 4:
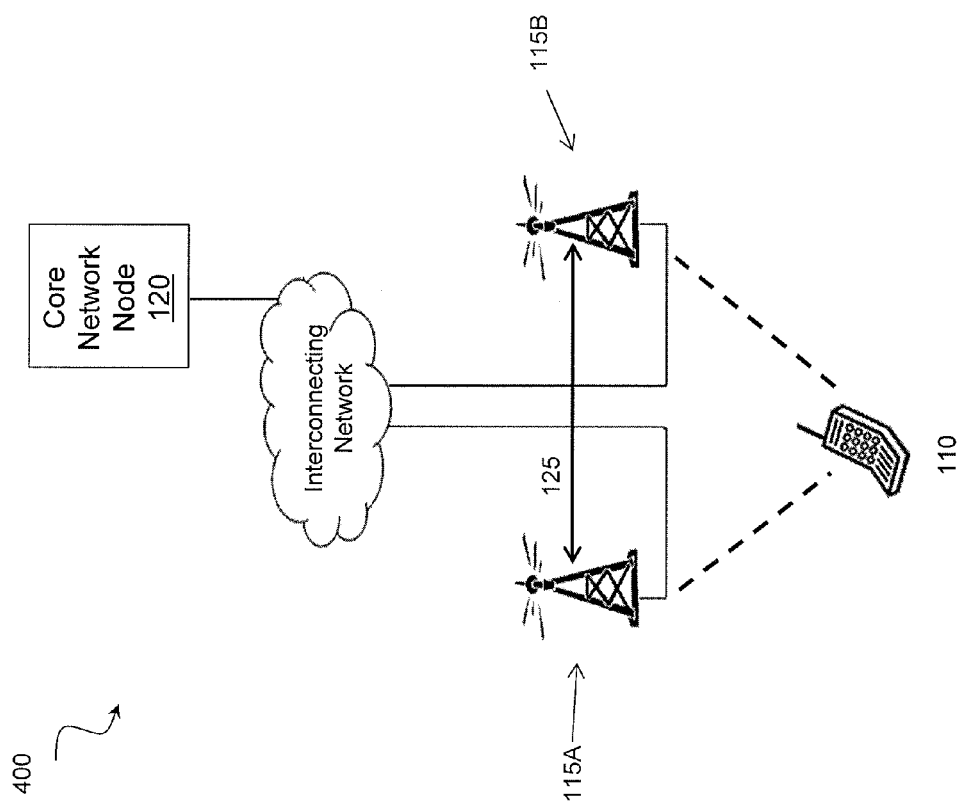
FIG. 4 is a block diagram illustrating an embodiment of a network, in accordance with certain embodiments.

FIG. 4 is a block diagram illustrating an embodiment of a network 400, in accordance with certain embodiments. Network 400 includes one or more UE(s) 110 (which may be interchangeably referred to as wireless devices 110), network node(s) 115 (which may be interchangeably referred to as eNBs 115), and core network node(s) 120. UE 110 may communicate with network node 115 over a wireless interface. For example, UE 110 may transmit wireless signals to one or more of network nodes 115A and 115B, and/or receive wireless signals from one or more of network nodes 115A and 115B. The wireless signals may contain voice traffic, data traffic, control signals, and/or any other suitable information. In some embodiments, an area of wireless signal coverage associated with a network node 115 may be referred to as a cell. In some embodiments, UE 110 may have dual connectivity capability. Thus, UE 110 may be able to receive signals from and/or transmit signals to at least two different network points simultaneously. For example, UE 110 may be able to receive signals from and/or transmit signals to network nodes 115A and 115B simultaneously. In certain embodiments, network node 115A may be an MeNB to which UE 110 is connected as the main eNB-UE link, and network node 115B may be an SeNB to which the UE is connected.

Although FIG. 4 illustrates one MeNB 115A and one SeNB 115B, the present disclosure contemplates that network 400 may include any suitable number of network nodes and any suitable combination of MeNBs and SeNBs, and that the various embodiments described herein may be applicable to scenarios involving more than one SeNB. Furthermore, although certain embodiments may be described by considering LTE, the embodiments are applicable to any radio access technology (RAT) or multi-RAT systems, where the UE receives and/or transmits signals (e.g., data). For example, the various embodiments described herein may be applicable to LTE FDD/TDD, WCDMA/HSPA, GSM/GERAN, Wi Fi, WLAN, CDMA2000, or any other suitable RAT. Moreover, the various embodiments can be applied to any suitable carrier aggregation cases. For example, the various embodiments may be applied to the carrier aggregation cases described above in relation to FIGS. 2A-2D, as well as any other suitable carrier aggregation scenarios. In other words, the embodiments may directly apply regardless of the number of CCs in DL or UL.

Network nodes 115 may interface with core network node 120. In certain embodiments, network nodes 115 may interface with core network node 120 via an interconnecting network. The interconnecting network may refer to any interconnecting system capable of transmitting audio, video, signals, data, messages, or any combination of the preceding. In certain embodiments, network nodes 115A and 115B may interface with one or more network nodes over an internode interface 125. For example, network nodes 115A and 115B may interface over an X2 interface. In some embodiments, core network node 120 may manage the establishment of communication sessions and various other functionality for UE 110. UE 110 may exchange certain signals with core network node 120 using the non-access stratum layer. In non-access stratum signaling, signals between UE 110 and core network node 120 may be transparently passed through the radio access network.

In some embodiments, the non-limiting term UE is used. The UE herein can be any type of wireless device capable of communicating with network nodes 115 or another UE over radio signals. The UE may also be a radio communication device, target device, device-to-device (D2D) UE, machine-type-communication UE or UE capable of machine to machine communication (M2M), a sensor equipped with UE, iPad, Tablet, mobile terminals, smart phone, laptop embedded equipped (LEE), laptop mounted equipment (LME), USB dongles, Customer Premises Equipment (CPE), etc. Also, in some embodiments generic terminology, "radio network node" or simply "network node (NW node)", is used. It can be any kind of network node which may comprise of base station, radio base station, base transceiver station, base station controller, network controller, evolved Node B (eNB), Node B, relay node, access point, radio access point, Remote Radio Unit (RRU), Remote Radio Head (RRH), etc. Example embodiments of UE 110, network nodes 115, and other network nodes (such as a radio network controller or core network node 120) are described with respect to FIGS. 7, 8, and 9, respectively.

In some embodiments, the terms first node and second node may be used, where first node can be MeNB 115A and second node can be SeNB 115B. The first node and second node may also be interchangeably called as first radio network node and second radio network node, respectively. In some embodiments, CC allocation of the UE is done by the first node or by the second node. In some embodiments, only the term node may be used, which can be first or second node (e.g., in case both first and second network nodes can perform the same task). In some embodiments, the term third network node may be used. The third network node may be used for configuring or managing the first and/or second network nodes. Examples of the third network node are core network node 120, SON, O&M, OSS, another eNodeB, or a master or central node. In some embodiments, the first and the third network nodes or the second and the third network nodes may be the same.

In some embodiments, UE capability is described in terms of the maximum number of CCs that UE 110 can use for dual connectivity operation (i.e., for carrier aggregation of CCs from different eNBs (i.e., MeNB 115A and SeNB 115B) is used. In some embodiments, such capability refers to the maximum total number of CCs from all network nodes involved in DC operation of UE 110. In some embodiments, such capability refers to the maximum number of CCs per network node involved in DC operation of UE 110. In some embodiments, such capability information is obtained in the network node based on one or more pre-defined rules, information received from UE 110, information received from another network node or any combination thereof.

A CC may be interchangeably referred to as a carrier, PCC, or SCC. A CC may be configured at UE 110 by a network node using higher layer signaling (e.g., by sending an RRC configuration message to UE 110). The configured CC may be used by the network node for serving UE 110 on the serving cell (e.g., on PCell, PSCell, SCell, etc.) of the configured CC. The configured CC may also be used by UE 110 for performing one or more radio measurements (e.g., RSRP, RSRQ, etc.) on the cells operating on the CC (e.g., PCell, SCell or PSCell, and neighboring cells). In some embodiments, the term determining is used and it may also be obtaining, receiving, detecting, identifying, etc., information or parameter etc.

As described above, the present disclosure contemplates various embodiments that may address the assignment of CCs in DC operation. As one example, in certain embodiments, a method in a network node of performing CC allocation based on currently allocated CCs to the UE is disclosed. As another example, in certain embodiments, a method in a network node for configuring the UE for an appropriate number of CCs is disclosed. As yet another example, in certain embodiments a method in a UE based on available UE capability is disclosed. The various embodiments are described in more detail below.

As described above, a method in a network node of adapting CC configuration based on currently configured CCs to UE 110 is disclosed. In certain embodiments, the CC configuration at UE 110 may be based on a predefined node priority. For example, MeNB 115A and SeNB 115B may configure UE 110 with one or more CCs in a predefined fashion. For example, if the limit is "X", then MeNB 115A can configure UE 110 to serve and/or measure up to $\alpha*X$ number of carriers, while SeNB 115B can configure for up to $(1-\alpha)*X$ carriers.

The values of X and $\alpha$ may be any suitable values, and may vary according to particular implementations. For example, in some cases, when both MeNB 115A and SeNB 115B have similar priority, then $\alpha=0.5$. As another example, if only one of MeNB 115A and SeNB 115B configures UE 110 for measurement, then $\alpha=1$ of MeNB 115A is given the priority and vice versa. The values of the parameters X and/or a may be pre-defined, or one or both parameters can be configured at MeNB 115A and SeNB 115B by a third network node (e.g., by core network node 120 or by MeNB 115A itself (i.e., the first and third network nodes are the same)). The parameters X and $\alpha$ may be based on any suitable criteria. For example, the parameter X may be based at least in part on UE 110's capability in terms of maximum total number (Y) of supported CCs for DC operation (i.e., for carrier aggregation of CCs from different network nodes 115 (i.e., MeNB 115A and SeNB 115B)). Where X<Y, for example, X=4 and Y=5. In another example, the value of X and α can be based at least in part on an amount of traffic in the buffer of UE 110 and/or in MeNB 115A and/or SeNB 115B for serving UE 110. For example, more CCs may be allocated to the network node 115 that has to serve a larger amount of traffic to UE 110.

In certain embodiments, CC configuration at UE 110 may be based on a combination of a predefined minimum number of CCs and a node priority. For example, each of MeNB 115A and SeNB 115B may be allocated a minimum number of component carriers that they are guaranteed the ability to configure for UE 110. In such a case, MeNB 115A will at least be able to configure UE 110 with up to MeNB 115A's minimum number of carriers, and SeNB 115B will at least be able to configure UE 110 with up to SeNB 115B's minimum number of carriers. One of the network nodes 115, however, such as MeNB 115A, may have priority for carriers beyond the minimum limit. In such a case, CCs are assigned according to a combination of the predefined minimum number of CCs and node priority.

To illustrate, consider the following example. Assume that MeNB 115A and SeNB 115B can at least configure up to a minimum number of CCs, N and M, respectively, where the total allowed limit of CCs X is greater than N+M (i.e., X>N+M). Up to N and M CCs are guaranteed for MeNB 115A and SeNB 115B, respectively. For carriers beyond N+M (and up to the total allowed limit X), UE 110 may always accept the configuration of component carriers that are requested to be configured by MeNB 115A in the example where MeNB 115A has priority. That is, if UE 110 has more than M carriers (e.g., M+m) for SeNB 115B but UE 110 receives a request from MeNB 115A to configure additional carriers (i.e., to configure more CCs for MeNB 115A); then, UE 110 will down prioritize one or more of m currently configured CCs for SeNB 115B and accept the request from MeNB 115A to configure one or more additional CCs for MeNB 115A.

The values N and M can be determined in any suitable manner. In certain embodiments, the values of N and M may be pre-defined or configured at MeNB 115A and SeNB 115B. For example, N and M may be configured at MeNB 115A and SeNB 115B by mutual signaling. As another example, the parameters N and M can also be configured at MeNB 115A and SeNB 115B, respectively, by a third network node (e.g., core network node 120). In some embodiments, the values N and M may be equal to or less than the maximum number of CCs per MeNB 115A and per SeNB 115B, as supported by UE 110 according to its capability related to DC operation.

In certain embodiments, the CC configuration at UE 110 may be based on a combination of a predefined minimum number of CCs and a first request. In such a case, MeNB 115A and SeNB 115B may configure UE 110 with at least a minimum number of carriers, but priority for configuring CCs at UE 110 beyond their minimum number of carriers is on a first come, first served (FCFS) basis.

To illustrate, consider the following example. Assume that MeNB 115A and SeNB 115B can configure UE 110 with at least N and M carriers, respectively, where the total allowed limit X (i.e., number of CCs) supported by UE 110 according to its capability is greater than N+M. As described above, N and M may be guaranteed to be configured at UE 110 by MeNB 115A and SeNB 115B, respectively. UE 110 can, however, be configured beyond N+M CCs by any of MeNB 115A and SeNB 115B on a FCFS basis. This is explained with an example where N=2, M=1 and X=4.

Assume that UE 110 is configured with N=2 and M=1 CCs by MeNB 115A and SeNB 115B, respectively. If SeNB 115B is the first to configure UE 110 with one additional CC, UE 110 cannot be configured with any more CCs by any other network node. In such a case, SeNB 115B and/or UE 110 may inform MeNB 115A that UE 110 is configured up to its capability limit (i.e., X). In other words, for carriers configured beyond N+M, UE 110 may prioritize the configuration of the oldest configured carriers configured by any of the nodes.

N and M may be determined in any suitable manner. For example, N and M can be pre-defined or configured at MeNB 115A and SeNB 115B (e.g., by mutual signaling or by a third network node, such as, for example, core network node 120). As another example, the values of N and M may also be chosen by a network node (e.g., MeNB 115A, SeNB 115B, third network node etc.) based on any suitable criteria. For example, the values of N and M may be chosen based on one or more of UE 110's capability in terms of maximum supported CCs (e.g., X), a capability of the network nodes in terms of maximum supported CCs per UE 110 or for a group of UEs, an amount of traffic or buffer size of UE 110, or any other suitable criteria. Moreover, MeNB 115A and SeNB 115B may be aware of each other's configurations. For example, MeNB 115A may be aware of SeNB 115B's configuration either via backhaul communication (e.g., X2) and/or informed by UE 110.

In certain embodiments, the assignment of component carriers may be configured based on priorities tagged to carriers. In such a case, one or more carriers may be tagged with a priority level. For example, carriers f1, f2, . . . , fk may have priority P1, P2, . . . , Pk, where P1 is of higher priority than P2, and so on.

As describe above, there may be a maximum limit on the number of CCs which can be configured at UE 110 by MeNB 115A and SeNB 115B, and also a total limit. The maximum limit may depend on factors such as UE 110's capability (i.e., maximum CCs that it can support in total and/or from each node for DC operation. To illustrate, consider the following examples. In a first example, UE 110 may accept the configuration of up to the maximum number of CCs according to its capability and CCs which are associated with the highest priority levels. If UE 110 is configured with 2 CCs by MeNB 115A, and 2 CCs by SeNB 115B, then any new configured CC associated with a priority larger than those of existing CCs can replace the existing CC with the lowest priority. In this case, the existing CC with lowest priority is deconfigured by UE 110, while a new one with higher priority is configured. If multiple requests for configuring CCs at UE 110 are received at UE 110 from the network nodes (e.g., MeNB 115A and SeNB 115B), then the request from the node for configuring UE 110 with the CC of higher priority is first accepted by UE 110. UE 110 may also accept requests from both MeNB 115A and SeNB 115B provided that the sum of the already configured CCs and CCs being currently configured does not exceed the total number of CCs supported by UE 110.

The principles elaborated in the above examples can be realized by pre-defined rules. Prior to that, MeNB 115A and SeNB 115B may assign a priority level to different CCs. The priority level may be assigned in any suitable manner. For example, MeNB 115A and SeNB 115B may assign a priority level to different CCs via backhaul communication (e.g., X2). The assignment of priority levels may be based on any one or more suitable criteria. As one example, the assignment of priority levels may be arbitrary. In such a case, CCs may be chosen randomly for assigning different priority levels (e.g., f3 with P1=0, f1 with P=1, and f2 with P=2). As another example, the assignment of priority levels may be based at least in part on a frequency range of the CC. In such a case, CCs may be chosen for different priority levels depending upon the frequency range (e.g., highest priority to CC with the lowest frequency). As yet another example, the assignment of priority level may be based at least in part on the frequency bands of CCs. For example, CCs in certain bands may be assigned lower priority levels than priority levels assigned for CCs in other bands (e.g., bands below 1 GHz may be assigned higher priority and bands equal or above 1 GHz may be assigned lower priority). This may be because the propagation characteristics (e.g., coverage, path loss etc.) of bands below 1 GHz or bands in lower frequency ranges may be more feasible for wireless communication. As still another example, the assignment of priority level may be based at least in part on a load or usage of CCs. In such a case, the CCs with higher load (e.g., higher utilization of radio resources such as RB usage) may be assigned with lower priority and vice versa. This approach enables load balancing across different carriers.

In certain embodiments, MeNB 115A and SeNB 115B may know about each other's configuration of CCs at UE 110. For example MeNB 115A and SeNB 115B may know about each other's configuration of CCs at UE 110 either via backhaul communication (e.g., X2) and/or informed by UE 110.

In certain embodiments, CC configuration at UE 110 may be based on a combination of a predefined minimum number of CCs and carrier priorities. For example, the CC configuration can be done as described above, except that MeNB 115A and SeNB 115B may configure up to certain minimum number of CCs (i.e., N and M). Beyond these minimum numbers, CCs may be autonomously selected by UE 110 based at least in part on the priority of the CC.

In certain embodiments, a method is disclosed for determining an appropriate number of CCs in network 400. For example, in certain embodiments there may be network coordination for determining an appropriate CC configuration. As described above, MeNB 115A and SeNB 115B may communicate via backhaul (e.g., over X2), or by any other suitable means, to coordinate one or more parameters associated with the configuration of CCs at UE 110 for DC operation. As another example, UE 110 may transmit one or more parameters related to CC configured by MeNB 115A to SeNB 115B or vice versa.

The one or more parameters related to CC configuration may be any suitable parameters. For example, the one or more parameters may include N, M, X, α and one or more priority levels associated with CCs (i.e., the parameters described above), or any other suitable parameter. For example, MeNB 115A and SeNB 115B may need to use a common value of the ratio α, as described above. To illustrate, consider the following examples of how MeNB 115A and SeNB 115B may determine the CC configuration.

As one example, MeNB 115A and SeNB 115B may recommend their preferred value to each other. For example, MeNB 115A may recommend α=0.75 for itself. In certain embodiments, MeNB 115A and SeNB 115B may converge on a common value based on a rule, such as mean value. In some embodiments, MeNB 115A may decide the value and SeNB 115B follows the decision made by the MeNB 115A. As another example, a third network node, such as core network node 120, may configure MeNB 115A and SeNB 115B with one or more parameters for configuring CCs at UE 110.

As another example, each network node involved in DC operation may inform the other network nodes about the current CC configurations used for UE 110. This may advantageously allow each node to be aware of the CCs configured at UE 110 by other nodes involved in DC operation. If a new CC needs to be configured, then a network node may only assign an available number of carrier(s) to UE 110, such that the limit X is not exceeded. As still another example, one of the network nodes, such as, for example, MeNB 115A, may permit another node to configure CCs while the permitting node (i.e., MeNB 115A) may not configure the CC such that limit X is not exceed.

As described above, the present disclosure also contemplates methods in UE 110 for handling CC configuration. In certain embodiments, UE 110 may autonomously deny CCs. For example, when UE 110 is configured with one or more new CCs for DC operation by a network node, such as MeNB 115A or SeNB 115B, UE 110 may compare the total number of configured CCs (including the latest one) with a threshold. The threshold may be based on any suitable criteria. For example, the threshold value may correspond to UE 110's capability. As another example, the threshold may depend upon the UE capability and/or an amount of traffic in buffer, or any other suitable factors. If the total CCs exceed the threshold, then UE 110 may autonomously deny this CC or any new CC configuration. Therefore, upon receiving a request for a new CC configuration from either MeNB 115A or from SeNB 115B, UE 110 may autonomously deny the request based on whether UE 110 is able to handle the additional CC or not. Such a rule may also be pre-defined and is followed by UE 110.

UE 110 may inform at least the network node whose carrier is denied (e.g., SeNB 115B). UE 110 may also inform the other network node (e.g., MeNB 115A), especially if UE 110 has no more connection with the network node whose carrier is denied. In certain embodiments, the network node receiving information may inform the other network node.

In certain embodiments, UE 110 may accept requests to configure a CC from a network node having higher priority. As described above, network nodes may be assigned different priority levels based. The priority levels may be assigned in any suitable manner. For example, the priority level of network nodes 115A and 115B may be based on a pre-defined rule, or configurable (i.e., temporary priority). UE 110 may use this information to prioritize configuration of CCs by the network node with higher priority. As one example, UE 110 may always accept requests for configuring one or more CCs at UE 110 from one of the network nodes (e.g., MeNB 115A requests), and thus, always down prioritize requests from other network nodes (e.g., SeNB 115B). Similarly, SeNB 115E may be given priority in some cases. For example, in some cases the priority may be based on temporal fairness between the nodes, link quality, or other suitable criteria. In such cases, the third network node (such as core network node 120) may temporarily assign such a temporary priority to SeNB 115B. The information about the node priority (i.e., which network node has a higher priority and which one has a lower priority) may be signaled to UE 110 in any suitable manner. For example, the information about node priority may be signaled to UE 110 by MeNB 115A and/or SeNB 115B or any other suitable network node.

In some embodiments, if a higher priority network node has already configured UE 110 to connect on Y number of carriers, then the second network node may only be able to configure for X-Y carriers, considering that a total of X number of CCs can be served by UE 110.

When a new carrier configuration from a prioritized node is signaled to UE 110, UE 110 may reduce one or more CCs currently being used by UE 110 for DC operation with the other node.

In certain embodiments, UE 110 may disconnect a carrier based on radio link monitoring (RLM). For example, if UE 110 cannot maintain radio link performance (e.g., due to radio link failure (RLF) or a signal quality of a serving cell falling below a threshold) on PCell of the PCC then it will relinquish that CC, or at least PCell (e.g., replace PCC with the current SCC). In other words, UE 110 may autonomously change its current PCC with one of the existing SCCs. The RLF occurs after consecutive out of sync detection (OOS), which is based on the DL signal quality of the PCell measured by UE 110. The detection of OOS is part of radio link monitoring (RLM) procedure in UE 110.

UE 110 may perform these actions based on one or more rules. The one or more rules may be pre-defined. As one example, a rule could be that due to RLF UE 110 may autonomously swap between PCC and one of the SCCs, or replace PCC with one of the SCCs (e.g., SCC whose serving cell is strongest in terms of DL signal quality). Another example of a pre-defined rule may be that UE 110 shall not serve (i.e., receive and/or transmit signals from) any of the CCs from a network node if UE 110 cannot meet RLM performance for any of the carriers configured from that network node. The RLM performance may be met if DL signal quality in terms of hypothetical BLER of PDCCH is below an in-sync (IS) threshold (e.g., 2%). The RLM performance may not be met if DL signal quality in terms of hypothetical BLER of PDCCH is above an OOS threshold (e.g., above 10%).

In certain embodiments, UE 110 may autonomously decide to accepts or reject a CC configuration based at least in part on band combinations. For example, UE 110 may decide to accept or reject a CC configuration request based on the type of carrier aggregation associated with the CC being configured by the network node. The requested CC may be an intra-band carrier aggregation CC or inter-band carrier aggregation CC, compared to currently configured CCs. UE 110 may, for example, decide to accept inter-band CC compared to intra-band CC. If the requested CC is intra-band CA, then UE 110 will not configure that CC. Different types of carrier aggregation lead to different levels of UE performance (e.g., throughput, maximum power reduction, etc.), power consumption and complexity. For example, if UE 110's battery is low, then UE 110 may only accept intra-band contiguous carrier aggregation, which may be more efficient in terms of power consumption.

Figure 5:
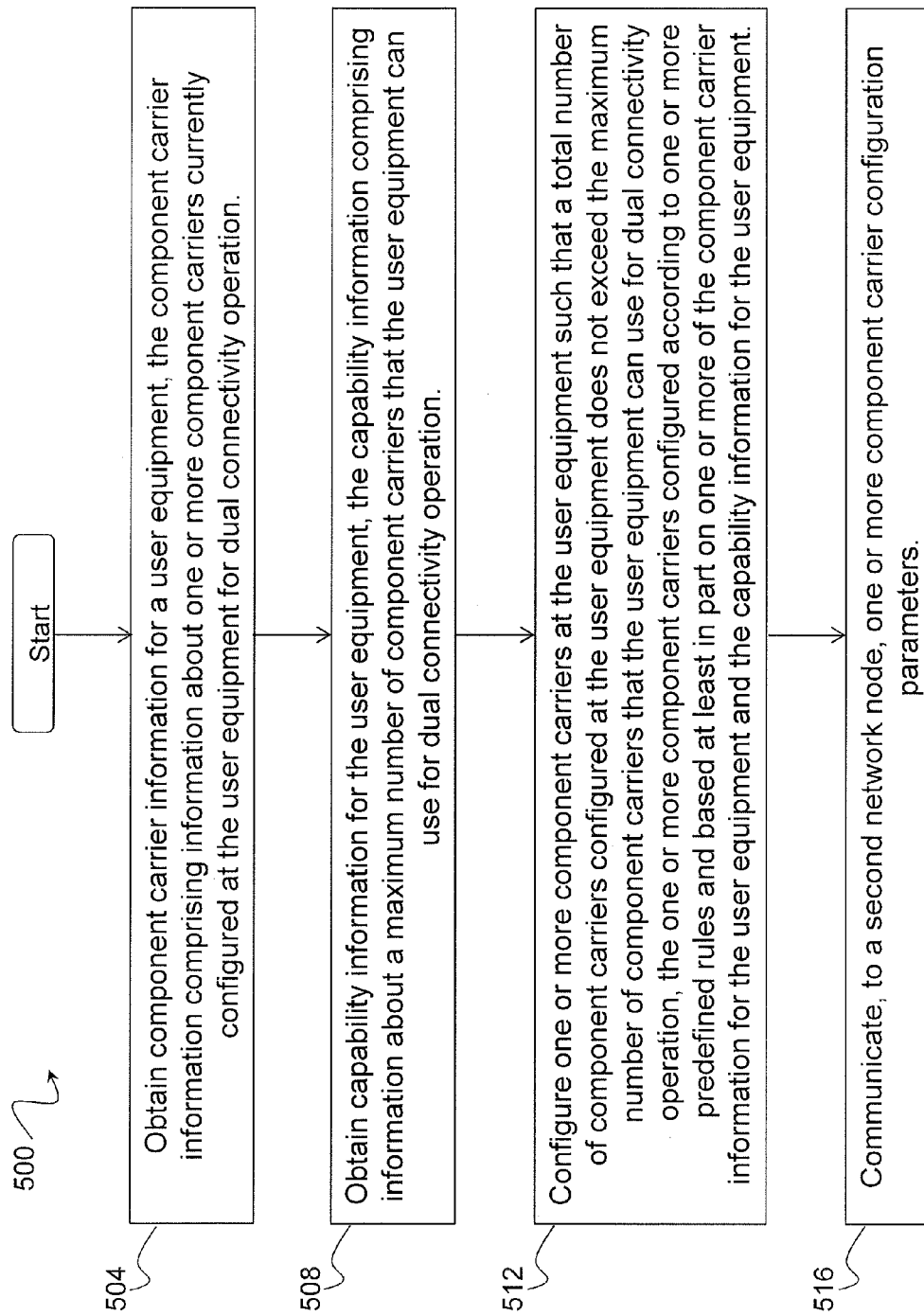
FIG. 5 is a flow chart of a method in a network node, in accordance with an embodiment.

FIG. 5 is a flow chart of a method in a network node, in accordance with an embodiment. The method begins at step 504, where the network node obtains component carrier information for a user equipment, the component carrier information comprising information about one or more component carriers currently configured at the user equipment for dual connectivity operation. In certain embodiments, the network node may be a Master eNodeB. The method may further comprise communicating, to a second network node, the obtained component carrier information about one or more component carriers currently configured at the user equipment At step 508, the network node obtains capability information for the user equipment, the capability information comprising information about a maximum number of component carriers that the user equipment can use for dual connectivity operation.

At step 512, the network node configures one or more component carriers at the user equipment such that a total number of component carriers configured at the user equipment does not exceed the maximum number of component carriers that the user equipment can use for dual connectivity operation, the one or more component carriers configured according to one or more predefined rules and based at least in part on one or more of the component carrier information for the user equipment and the capability information for the user equipment. In certain embodiments, the one or more predefined rules may define a proportion of the maximum number of component carriers that the user equipment can use for dual connectivity operation that may be configured by the network node, and configuring the one or more component carriers at the user equipment may comprise configuring one or more component carriers up to the predefined proportion of the maximum number of component carriers that the user equipment can use for dual connectivity operation. The proportion of the maximum number of component carriers may be a first proportion, and the one or more predefined rules may define a second proportion of the maximum number of component carriers that the user equipment can use for dual connectivity operation that may be assigned by a second network node.

In certain embodiments, the network node may be a first network node, and the one or more predefined rules may define a minimum number of component carriers that may be configured by the first network node and a minimum number of component carriers that may be configured by a second network node. Configuring one or more component carriers at the user equipment such that the total number of component carriers configured at the user equipment does not exceed the maximum number of component carriers that the user equipment can use for dual connectivity operation may comprise configuring, by the first network node, the minimum number of component carriers that may be assigned by the first network node.

In some embodiments, a total of the minimum number of component carriers that may be configured by the first network node and the minimum number of component carriers that may be configured by the second network node may be less than the maximum number of component carriers that the user equipment can use for dual connectivity operation, and the one or more predefined rules may further comprise that the first network node has priority for component carriers to be configured in addition to the minimum number of component carriers that may be configured by the first network node and the minimum number of component carriers that may be configured by the second network node. The method may further comprise configuring, by the first network node, additional component carriers beyond the minimum number of component carriers.

In certain embodiments, a total of the minimum number of component carriers that may be configured by the first network node and the minimum number of component carriers that may be configured by the second network node is less than the maximum number of component carriers that the user equipment can use for dual connectivity operation, and the one or more predefined rules may further comprise prioritizing component carriers to be configured in addition to the minimum number of component carriers that may be configured by the first network node and the minimum number of component carriers that may be configured by the second network node on a first come first serve basis. The method may further comprise configuring, by the first network node, additional component carriers beyond the minimum number of component carriers if the first network node requests that an additional component carrier be configured before the second network node.

In certain embodiments, the network node may be a first network node, and the one or more predefined rules may define a number of component carriers that may be assigned by the first network node and a number of component carriers that may be assigned by a second network node. The method may further comprise assigning each of the component carriers a priority level, wherein each of the component carriers may be accepted or deconfigured by the user equipment based at least in part on the priority level of the component carriers. The priority level of each of the component carriers may be assigned based on one or more of a random assignment, a frequency range of each component carrier, a frequency band of each component carrier, a load of each component carrier, and a usage of each component carrier. The one or more predefined rules may define a number of component carriers that may be assigned by the first network node and a number of component carriers that may be assigned by the second network node, and component carriers in addition to the number of component carriers that may be configured by the first network node and the number of component carriers that may be configured by the second network node may be configured at the user equipment according to the assigned priorities.

At step 516, the network node communicates, to a second network node, one or more component carrier configuration parameters. The second network node may comprise a secondary eNodeB (SeNB). The one or more component carrier configuration parameters may include one or more of: a maximum number of component carriers that the user equipment can use for dual connectivity operation; a proportion of the maximum number of component carriers that the network node may configure for the user equipment for dual connectivity operation; a proportion of the maximum number of component carriers that a second network node may configure for the user equipment for dual connectivity operation; a minimum number of component carriers that may be assigned by the first network node; a minimum number of component carriers that may be assigned by the second network node; and a priority level assigned to a particular component carrier. In certain embodiments, the method may comprise receiving, from the user equipment, one or more component carrier configuration parameters. In certain embodiments, the method may include receiving, from a second network node, one or more component carrier configuration parameters.

In certain embodiments, the method may further comprise receiving one or more component carrier configuration parameters from a third network node. The method may further comprise communicating, to a second network node, a recommended value for a particular component carrier configuration parameter and determining a common value for the particular component carrier configuration parameter based on a predefined rule. The method may further comprise permitting a second network node to configure component carriers at the user equipment. In certain embodiments, the method may further comprise receiving an indication that a request to configure a component carrier at the user equipment has been denied.

Figure 6:
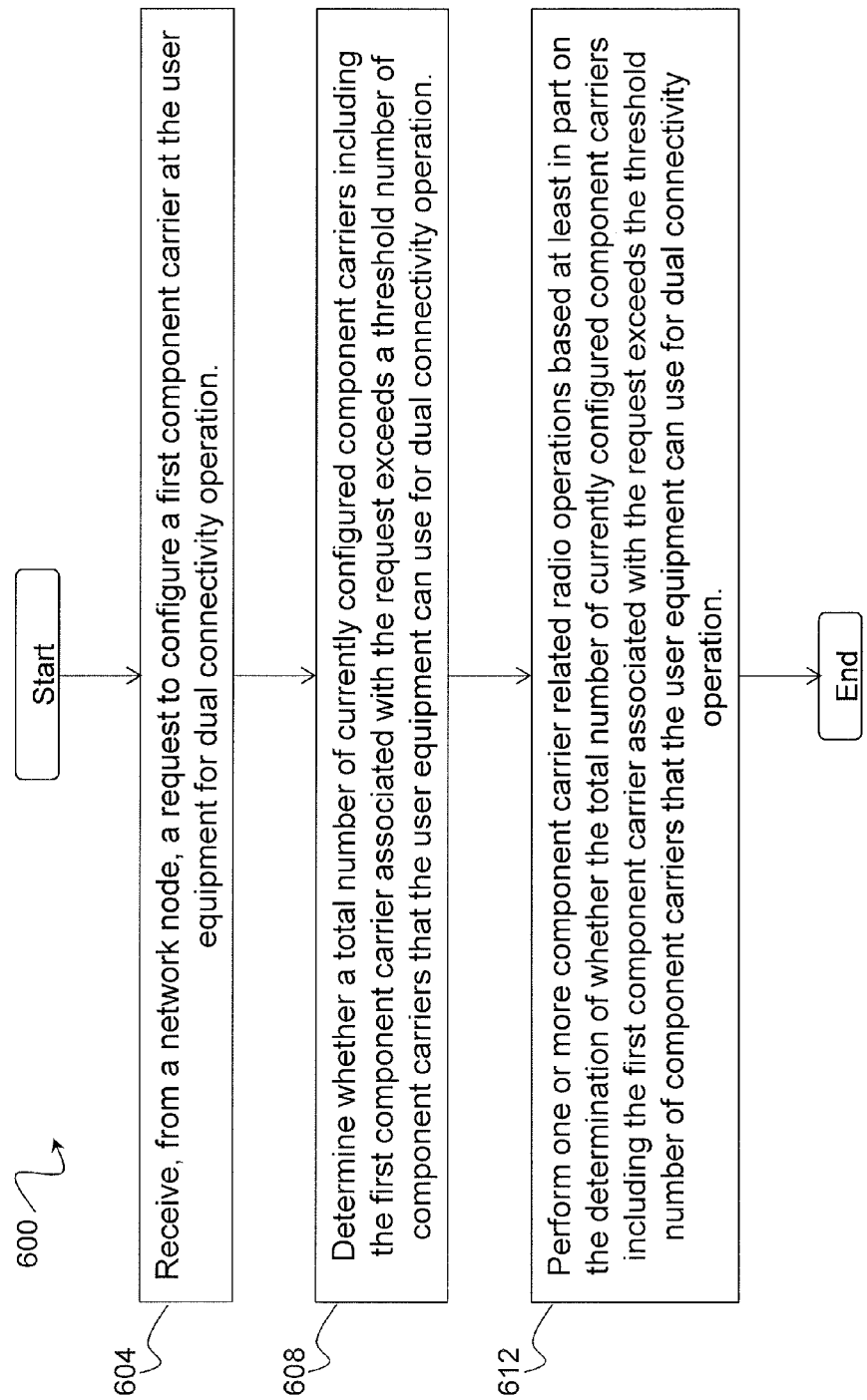
FIG. 6 is a flow chart of a method in a user equipment, in accordance with an embodiment.

FIG. 6 is a flow chart of a method in a user equipment, in accordance with an embodiment. The method begins at step 604, where the user equipment receives, from a network node, a request to configure a first component carrier at the user equipment for dual connectivity operation.

At step 608, the network node determines whether a total number of currently configured component carriers including the first component carrier associated with the request exceeds a threshold number of component carriers that the user equipment can use for dual connectivity operation.

At step 612, the network node performs one or more component carrier related radio operations based at least in part on the determination of whether the total number of currently configured component carriers including the first component carrier associated with the request exceeds the threshold number of component carriers that the user equipment can use for dual connectivity operation.

In certain embodiments, performing one or more component carrier related radio operations may comprise upon determining that the total number of currently configured component carriers including the first component carrier associated with the request exceeds the threshold number of component carriers that the user equipment can use for dual connectivity operation, autonomously denying the request to configure the first component carrier. The method may further comprise communicating, to the network node, an indication that the request to configure the first component carrier at the user equipment for dual connectivity operation has been denied. The method may further comprise communicating, to a second network node, an indication that the request to configure the first component carrier at the user equipment for dual connectivity operation has been denied.

In certain embodiments, the network node may be a first network node having an associated first priority level, and the method may further comprise receiving, from a second network node, a request to configure a second component carrier at the user equipment for dual connectivity operation, the second network node having an associated second priority level, and determining whether the first network node or the second network node has a higher priority level. Performing one or more component carrier related radio operations may comprise upon determining that the first priority level associated with the first network node has the higher priority level, accepting the request to configure the first component carrier associated with the first network node. The method may further comprise upon determining that the first network node has the higher priority level, down prioritizing one or more requests to configure one or more component carriers from the second network node. The first priority level associated with the first network node and the second priority level associated with the second network node may be based at least in part on one or more of temporal fairness between the first network node and the second network node and a link quality.

In certain embodiments, the first priority level associated with the first network node and the second priority level associated with the second network node may be assigned by a third network node. The method may further comprise receiving information about one or more of the first priority level associated with the first network node and the second priority level associated with the second network node. The method may further comprise accepting one or more requests from the second network node to configure a component carrier at the user equipment for dual connectivity operation, wherein a number of requests from the second network node that the user equipment may accept is limited to a difference between the threshold number of component carriers that the user equipment can use for dual connectivity operation and a number of component carriers already configured by the first network node. The method may further comprise receiving a new component carrier configuration from the first network node having the higher priority level and reducing a number of component carriers configured by the second network node for dual connectivity operation in response to receiving the new component carrier configuration from the first network node.

In certain embodiments, the user equipment may be configured with at least a primary component carrier associated with the first network node and one or more secondary component carriers associated with a second network node. The method may further comprise determining that radio link performance cannot be maintained on the primary component carrier associated with the first network node, and replacing the primary component carrier associated with the first network node with one of the one or more secondary component carriers associated with the second network node. Determining that radio link performance cannot be maintained on the primary component carrier associated with the first network node may comprise detecting consecutive out of sync measurements on the primary component carrier associated with the first network node as part of radio link monitoring. The method may further comprise determining whether a signal quality of one or more component carriers configured by the first network node and the second network node is above an out-of-sync threshold, and serving component carriers from the first network node and the second network node only if both the signal quality of both the first network node and the second network node is above the out-of-sync threshold.

In certain embodiments, the network node may be a first network node, the request to configure the first component carrier may be a first request, and the first component carrier may have an associated first carrier aggregation type. The method may further comprise receiving, from a second network node, a second request to configure a second component carrier at the user equipment for dual connectivity operation, the second component carrier having an associated second carrier aggregation type. Performing one or more component carrier related radio operations may comprise accepting one or more of the first request to configure the first component carrier from the first network node and the second request to configure the second component carrier from the second network node based at least in part on one or more of the first carrier aggregation type and the second carrier aggregation type. The method may further comprise rejecting one or more of the first request to configure the first component carrier from the first network node and the second request to configure the second component carrier from the second network node based at least in part on one or more of the first carrier aggregation type and the second carrier aggregation type. The first and second carrier aggregation types may comprise one of intra-band carrier aggregation or inter-band carrier aggregation.

In certain embodiments, the network node may be a first network node and the first component carrier may have an associated first priority level. The method may further comprise receiving, from a second network node, a request to configure a second component carrier at the user equipment for dual connectivity operation, the second component carrier having an associated second priority level, determining whether the first component carrier or the second component carrier has the higher priority level, and upon determining that the first component carrier has the higher priority, accepting the request to configure the first component carrier at the user equipment from the first network node. The method may further comprise determining that the first component carrier has a higher priority than a previously configured component carrier, and upon determining that the first component carrier has a higher priority than the previously configured component carrier, replacing the previously configured component carrier with the first component carrier. In certain embodiments, the priority level of the first and second component carriers may be based on one or more of: a random assignment, a frequency range of each component carrier; a frequency band of each component carrier; a load of each component carrier, and a usage of each component carrier.

Figure 7:
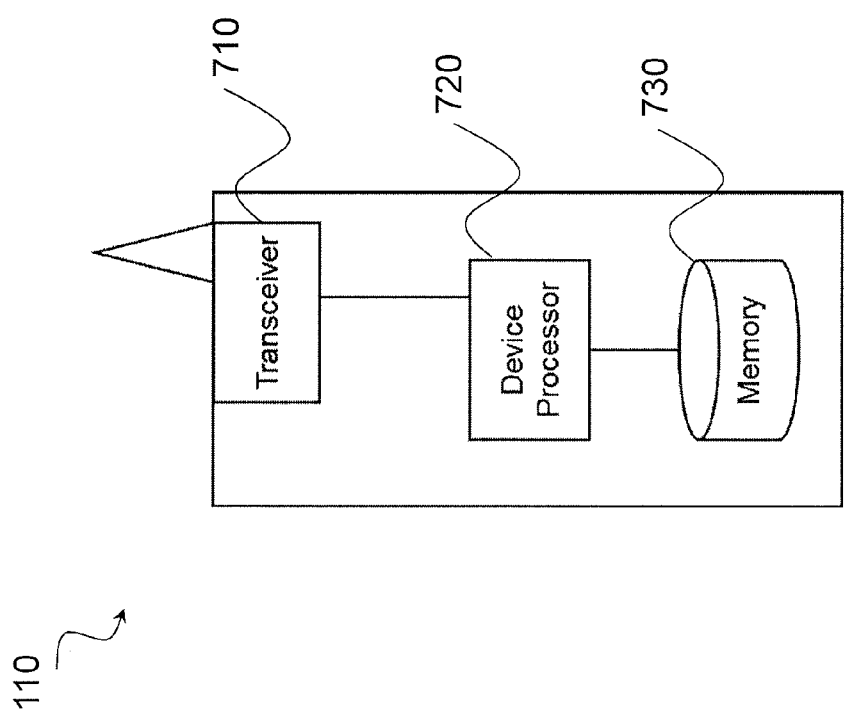
FIG. 7 is a block schematic of an exemplary wireless device, in accordance with certain embodiments.

FIG. 7 a block schematic of an exemplary wireless device 110, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine to machine (M2M) device, laptop embedded equipment (LEE), laptop mounted equipment (LME), USB dongles, a device-to-device capable device, or another device that can provide wireless communication. A wireless device 110 may also be referred to as user equipment (UE), a station (STA), a device, or a terminal in some embodiments. Wireless device 110 includes transceiver 710, processor 720, and memory 730. In some embodiments, transceiver 710 facilitates transmitting wireless signals to and receiving wireless signals from network node 115 (e.g., via an antenna), processor 720 executes instructions to provide some or all of the functionality described above as being provided by wireless device 110, and memory 730 stores the instructions executed by processor 720.

Processor 720 may include any suitable combination of hardware and software implemented in one or more modules to execute instructions and manipulate data to perform some or all of the described functions of wireless device 110. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

Figure 8:
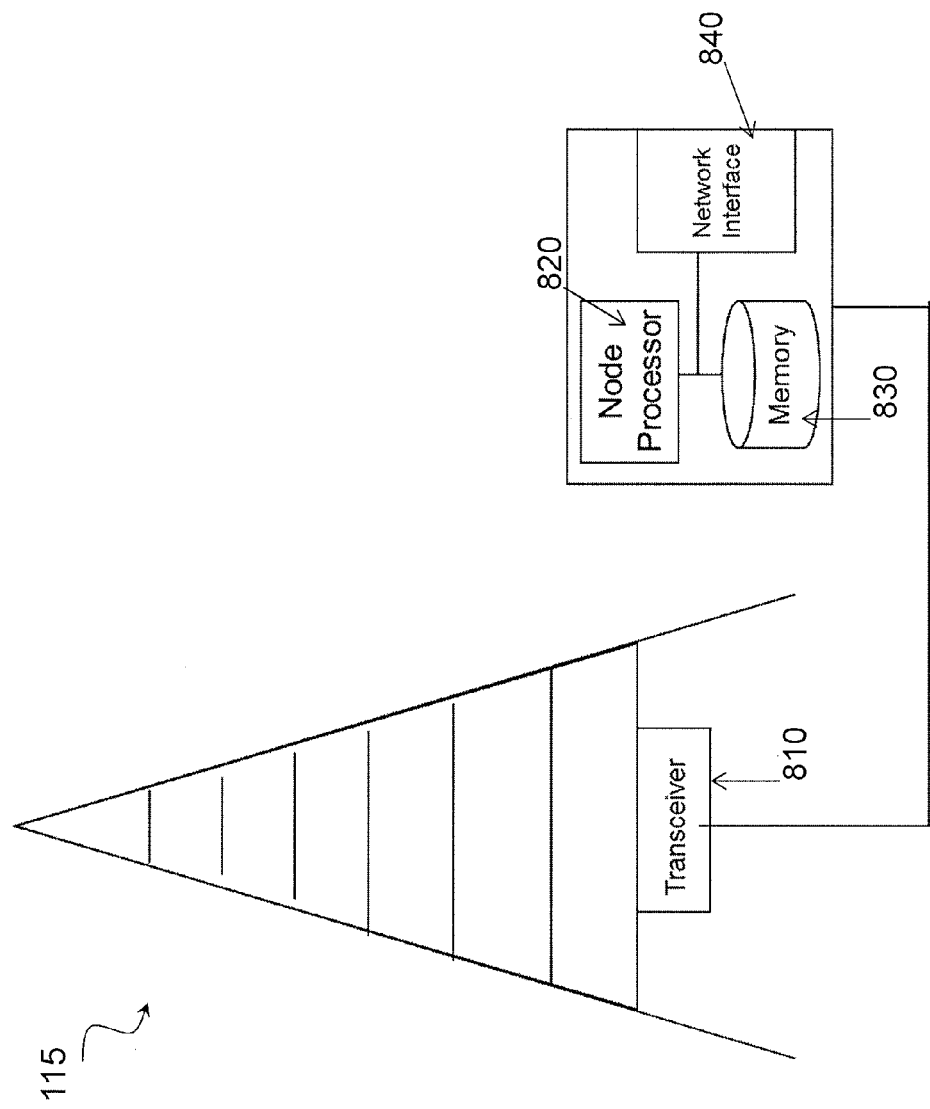
FIG. 8 is a block schematic of an exemplary network node, in accordance with certain embodiments.

Other embodiments of wireless device 110 may include additional components beyond those shown in FIG. 8 that may be responsible for providing certain aspects of the wireless device's functionality, including any of the functionality described above and/or any additional functionality (including any functionality necessary to support the solution described above).

In certain embodiments, wireless device 110 may include one or more modules. For example, wireless device 110 may include a determining module, a communication module, a receiver module, an input module, a display module, and any other suitable modules. The determining module may perform the processing functions of wireless device 110. For example, the determining module may determine whether a total number of currently configured component carriers including the first component carrier associated with a request exceeds a threshold number of component carriers that the user equipment can use for dual connectivity operation. As another example, the determining module may perform one or more component carrier related radio operations based at least in part on the determination of whether the total number of currently configured component carriers including the first component carrier associated with the request exceeds the threshold number of component carriers that the user equipment can use for dual connectivity operation. As yet another example, the determining module may determine whether a first network node or a second network node has a higher priority level. As still another example, the determining module may determine that radio link performance cannot be maintained on a primary component carrier associated with a first network node. As yet another example, the determining module may determine whether a signal quality of one or more component carriers configured by the first network node and the second network node is above an out-of-sync threshold. The determining module may include or be included in processor 720. The determining module may include analog and/or digital circuitry configured to perform any of the functions of the determining module and/or processor 720. The functions of the determining module described above may, in certain embodiments, be performed in one or more distinct modules.

The communication module may perform the transmission functions of wireless device 110. The communication module may transmit messages to one or more of network nodes 115 of network 100. For example, the communication module may communicate, to one or more network nodes, an indication that a request to configure a component carrier at the user equipment for dual connectivity operation has been denied. As another example, the communication module may communicate one or more component carrier configuration parameters to a network node. The communication module may include a transmitter and/or a transceiver, such as transceiver 710. The communication module may include circuitry configured to wirelessly transmit messages and/or signals. In particular embodiments, the communication module may receive messages and/or signals for transmission from the determining module.

The receiving module may perform the receiving functions of wireless device 110. For example, the receiving module may receive, from one or more network nodes, one or more requests to configure a component carrier at the user equipment for dual connectivity operation. As another example, the receiving module may receive information about a first priority level associated with a first network node and a second priority level associated with a second network node. As yet another example, the receiving module may receive a new component carrier configuration from a network node having the higher priority level. The receiving module may include a receiver and/or a transceiver. The receiving module may include circuitry configured to wirelessly receive messages and/or signals. In particular embodiments, the receiving module may communicate received messages and/or signals to the determining module.

The input module may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to the determining module.

The display module may present signals on a display of wireless device 110. The display module may include the display and/or any appropriate circuitry and hardware configured to present signals on the display. The display module may receive signals to present on the display from the determining module.

FIG. 8 is a block schematic of an exemplary network node 115, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network node 115 may be capable of dual connectivity operation, and network node 115 may be an MeNB or an SeNB.

Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 810, processor 820, memory 830, and network interface 840. In some embodiments, transceiver 810 facilitates transmitting wireless signals to and receiving wireless signals from wireless device 110 (e.g., via an antenna), processor 820 executes instructions to provide some or all of the functionality described above as being provided by a network node 115, memory 830 stores the instructions executed by processor 820, and network interface 840 communicates signals to backend network components, such as a gateway, switch, router, Internet, Public Switched Telephone Network (PSTN), core network nodes 130, radio network controllers 120, etc.

Processor 820 may include any suitable combination of hardware and software implemented in one or more modules to execute instructions and manipulate data to perform some or all of the described functions of network node 115. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for network node 115, send output from network node 115, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

In certain embodiments, network node 115 may include a determining module, a communication module, a receiving module, and any other suitable modules. In some embodiments, one or more of the determining module, communication module, receiving module, or any other suitable module may be implemented using one or more processors 820 of FIG. 8. In certain embodiments, the functions of two or more of the various modules may be combined into a single module.

The determining module may perform the processing functions of network node 115. For example, the determining module may configure one or more component carriers at a user equipment such that a total number of component carriers configured at the user equipment does not exceed the maximum number of component carriers that the user equipment can use for dual connectivity operation. The determining module may configure the one or more component carriers according to one or more predefined rules. As another example, the determining module may determine a common value for a particular component carrier configuration parameter based on a predefined rule. The determining module may include or be included in processor 820. The determining module may include analog and/or digital circuitry configured to perform any of the functions of the determining module and/or processor 820. The functions of the determining module described above may, in certain embodiments, be performed in one or more distinct modules.

The communication module may perform the transmission functions of network node 115. The communication module may transmit messages to one or more of wireless devices 110. For example, the communication module may communicate one or more component carrier configuration parameters. As another example, the communication module may communicate, to a second network node, a recommended value for a particular component carrier configuration parameter. As yet another example, the communication module may communicate obtained component carrier information about one or more component carriers currently configured at a user equipment. The communication module may include a transmitter and/or a transceiver, such as transceiver 810. The communication module may include circuitry configured to wirelessly transmit messages and/or signals. In particular embodiments, the communication module may receive messages and/or signals for transmission from the determining module or any other module.

The receiving module may perform the receiving functions of network node 115. The receiving module may receive any suitable information from a wireless device. For example, the receiving module may receive one or more component carrier configuration parameters. As another example, the receiving module may receive an indication that a request to configure a component carrier at the user equipment has been denied. The receiving module may include a receiver and/or a transceiver. The receiving module may include circuitry configured to wirelessly receive messages and/or signals. In particular embodiments, the receiving module may communicate received messages and/or signals to the determining module or any other suitable module.

Other embodiments of network node 115 may include additional components beyond those shown in FIG. 8 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 9:
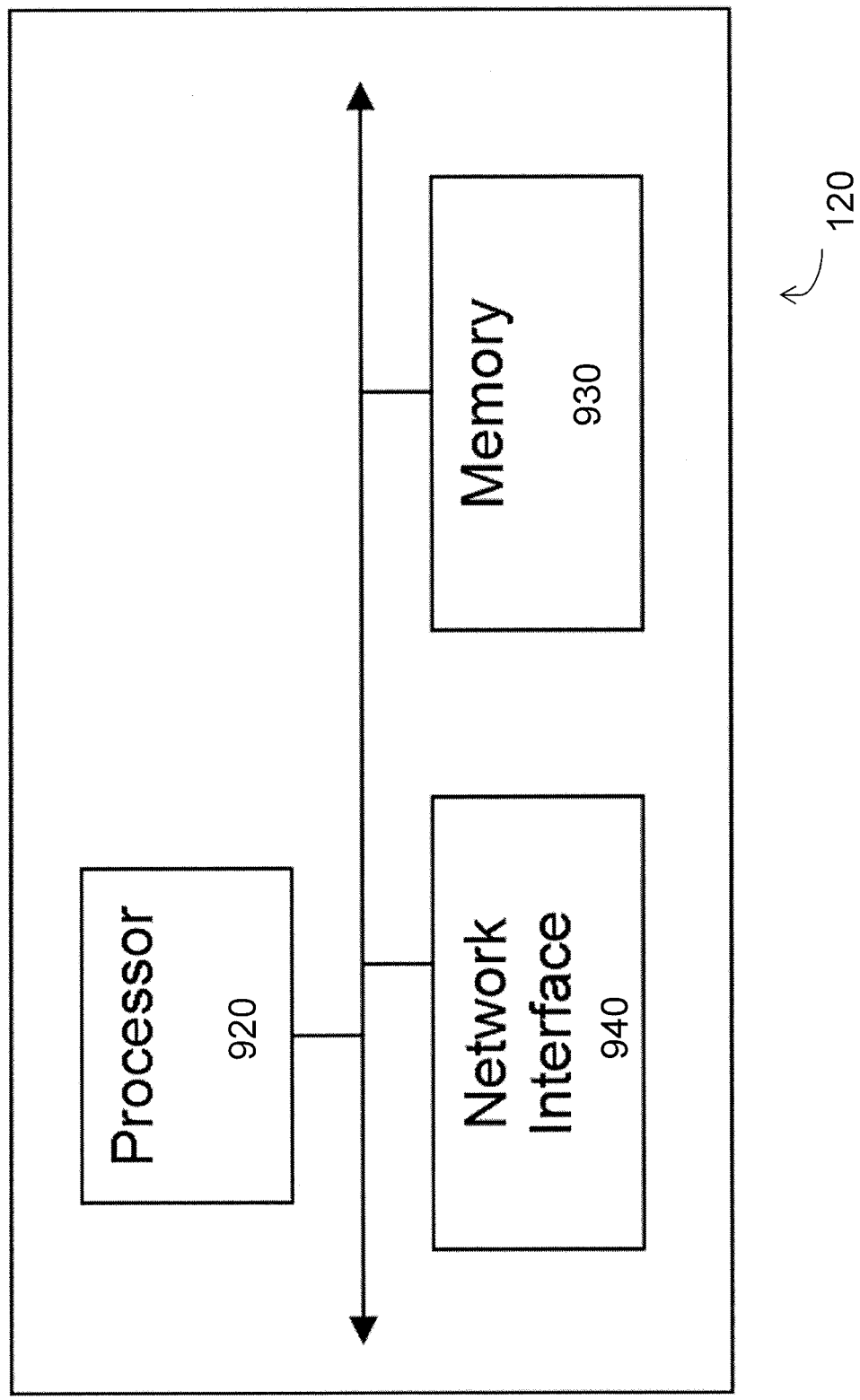
FIG. 9 is a block schematic of an exemplary radio network controller or core network node, in accordance with certain embodiments.

FIG. 9 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 120 include processor 920, memory 930, and network interface 940. In some embodiments, processor 920 executes instructions to provide some or all of the functionality described above as being provided by the network node, memory 930 stores the instructions executed by processor 920, and network interface 940 communicates signals to any suitable node, such as a gateway, switch, router, Internet, Public Switched Telephone Network (PSTN), network nodes 115, radio network controllers or core network nodes 120, etc.

Processor 920 may include any suitable combination of hardware and software implemented in one or more modules to execute instructions and manipulate data to perform some or all of the described functions of the radio network controller or core network node 120. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 940 is communicatively coupled to processor 920 and may refer to any suitable device operable to receive input for the network node, send output from the network node, perform suitable processing of the input or output or both, communicate to other devices, or any combination of the preceding. Network interface 940 may include appropriate hardware (e.g., port, modem, network interface card, etc.) and software, including protocol conversion and data processing capabilities, to communicate through a network.

Other embodiments of the network node may include additional components beyond those shown in FIG. 9 that may be responsible for providing certain aspects of the network node's functionality, including any of the functionality described above and/or any additional functionality (including any functionality necessary to support the solution described above).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
MeNB Master eNode B
SeNB Secondary eNode B
pSCell Primary SCell
PCC Primary Component Carrier
PCI Physical Cell Identity
PSS Primary Synchronization Signal
RAT Radio Access Technology
RRC Radio Resource Control
RSCP Received Signal Code Power
RSRP Reference Signal Received Power
RSRQ Reference Signal Received Quality
RSSI Received Signal Strength Indication
SCC Secondary Component Carrier
SIB System Information Block
SON Self-Organizing Networks
SSS Secondary Synchronization Signal
TDD Time Division Duplex
UARFCN UMTS Absolute Radio Frequency Channel Number
HO Handover
UE User Equipment
RNC Radio Network Controller
BSC Base Station Controller
PCell Primary Cell
SCell Secondary Cell
CPICH Common Pilot Channel
ECGI E-UTRAN Cell Global Identity
HSPA High Speed Packet Access
GSM Global System for Mobile Communication
UARFCN UMTS ARFCN
UTRAN Universal Terrestrial Radio Access Network
UTRA Universal Terrestrial Radio Access
UTRA FDD UTRA Frequency Division Duplex
UTRA TDD UTRA Time Division Duplex
WLAN Wireless Local Area Network
GERAN GSM EDGE Radio Access Network
EDGE Enhanced Data rates for GSM Evolution
CDMA2000 Code division multiple access 2000
HRPD High Rate Packet Data

The invention claimed is:

1. A method in a first network node, comprising:
obtaining component carrier information for a user equipment, the component carrier information comprising information about one or more component carriers currently configured at the user equipment for dual connectivity operation;
obtaining capability information for the user equipment, the capability information comprising information about a maximum number of component carriers that the user equipment is configured to use for dual connectivity operation;
configuring one or more component carriers at the user equipment such that a total number of component carriers configured at the user equipment does not exceed the maximum number of component carriers that the user equipment is configured to use for dual connectivity operation, the one or more component carriers configured according to one or more predefined rules and based at least in part on one or more of the component carrier information for the user equipment and the capability information for the user equipment, wherein:
the one or more predefined rules define a minimum number of component carriers that are configurable by the first network node and a minimum number of component carriers that are configurable by a second network node; and
configuring one or more component carriers at the user equipment comprises configuring, by the first network node, the minimum number of component carriers that are configurable by the first network node.

2. The method of claim 1, wherein:
the one or more predefined rules define a proportion of the maximum number of component carriers that the user equipment is configured to use for dual connectivity operation that are configurable by the first network node; and
configuring the one or more component carriers at the user equipment comprises configuring one or more component carriers up to the predefined proportion of the maximum number of component carriers that the user equipment is configured to use for dual connectivity operation.

3. The method of claim 2, wherein:
the proportion of the maximum number of component carriers is a first proportion; and
the one or more predefined rules define a second proportion of the maximum number of component carriers that the user equipment is configured to use for dual connectivity operation that are configurable by the second network node.

4. The method of claim 1, wherein:
a total of the minimum number of component carriers that are configurable by the first network node and the minimum number of component carriers that are configurable by the second network node is less than the maximum number of component carriers that the user equipment is configured to use for dual connectivity operation;
the one or more predefined rules further comprise that the first network node has priority for component carriers to be configured in addition to the minimum number of component carriers that are configurable by the first network node and the minimum number of component carriers that are configurable by the second network node; and the method further comprises configuring, by the first network node, additional component carriers beyond the minimum number of component carriers.

5. The method of claim 4, wherein:
a total of the minimum number of component carriers that are configurable by the first network node and the minimum number of component carriers that are configurable by the second network node is less than the maximum number of component carriers that the user equipment is configured to use for dual connectivity operation;
the one or more predefined rules further comprise prioritizing component carriers to be configured in addition to the minimum number of component carriers that are configurable by the first network node and the minimum number of component carriers that are configurable by the second network node on a first come first serve basis; and
the method further comprises configuring, by the first network node, additional component carriers beyond the minimum number of component carriers if the first network node requests that an additional component carrier be configured before the second network node.

6. The method of claim 1, wherein:
the one or more predefined rules define a number of component carriers that are assignable by the first network node and a number of component carriers that are assignable by the second network node; and
the method further comprises assigning each of the component carriers a priority level, wherein the user equipment is configured to accept or deconfigure each of the component carriers based at least in part on the priority level of the component carriers.

7. The method of claim 6, wherein the priority level of each of the component carriers is assigned based on one or more of:
a random assignment;
a frequency range of each component carrier;
a frequency band of each component carrier;
a load of each component carrier; and
a usage of each component carrier.

8. The method of claim 6, wherein:
the one or more predefined rules define a number of component carriers that are assignable by the first network node and a number of component carriers that are assignable by the second network node; and
component carriers in addition to the number of component carriers that are configurable by the first network node and the number of component carriers that are configurable by the second network node are configured at the user equipment according to the assigned priorities.

9. The method of claim 1, further comprising communicating, to the second network node, one or more component carrier configuration parameters, the one or more component carrier configuration parameters comprising one or more of:
a maximum number of component carriers that the user equipment is configured to use for dual connectivity operation;
a proportion of the maximum number of component carriers that are configurable by the first network node for the user equipment for dual connectivity operation;
a proportion of the maximum number of component carriers that are configurable by the second network node for the user equipment for dual connectivity operation;
a minimum number of component carriers that are assignable by the first network node;
a minimum number of component carriers that are assignable by the second network node; and
a priority level assigned to a particular component carrier.

10. The method of claim 1, further comprising receiving, from the user equipment, one or more component carrier configuration parameters, the one or more component carrier configuration parameters comprising one or more of:
a maximum number of component carriers that the user equipment is configured to use for dual connectivity operation;
a proportion of the maximum number of component carriers that are configurable by the first network node for the user equipment for dual connectivity operation;
a proportion of the maximum number of component carriers that are configurable by the second network node for the user equipment for dual connectivity operation;
a minimum number of component carriers that are assignable by the first network node;
a minimum number of component carriers that are assignable by the second network node; and
a priority level assigned to a particular component carrier.

11. The method of claim 1, further comprising receiving, from the second network node, one or more component carrier configuration parameters, the one or more component carrier configuration parameters comprising one or more of:
a maximum number of component carriers that the user equipment is configured to use for dual connectivity operation;
a proportion of the maximum number of component carriers that are configurable by the first network node for the user equipment for dual connectivity operation;
a proportion of the maximum number of component carriers that are configurable by the second network node for the user equipment for dual connectivity operation;
a minimum number of component carriers that are assignable by the first network node;
a minimum number of component carriers that are assignable by the second network node; and
a priority level assigned to a particular component carrier.

12. The method of claim 1, further comprising:
communicating, to the second network node, a recommended value for a particular component carrier configuration parameter; and
determining a common value for the particular component carrier configuration parameter based on a predefined rule.

13. The method of claim 1, wherein:
the first network node is a Master eNodeB (MeNB); and
the method further comprises communicating one or more component carrier configuration parameters to the second network node, the second network node comprising a secondary eNodeB (SeNB).

14. The method of claim 1, further comprising receiving one or more component carrier configuration parameters from a third network node.

15. The method of claim 1, further comprising communicating, to the second network node, the obtained component carrier information about one or more component carriers currently configured at the user equipment.

16. The method of claim 1, further comprising permitting the second network node to configure component carriers at the user equipment.

17. The method of claim 1, further comprising receiving an indication that a request to configure a component carrier at the user equipment has been denied.

18. A first network node, comprising:
a receiver;
a transmitter;
a network interface; and
one or more processors coupled to the receiver, the transmitter, and the network interface, the one or more processors configured to:
obtain component carrier information for a user equipment, the component carrier information comprising information about one or more component carriers currently configured at the user equipment for dual connectivity operation;
obtain capability information for the user equipment, the capability information comprising information about a maximum number of component carriers that the user equipment is configured to use for dual connectivity operation;
configure one or more component carriers at the user equipment such that a total number of component carriers configured at the user equipment does not exceed the maximum number of component carriers that the user equipment is configured to use for dual connectivity operation, the one or more component carriers configured according to one or more predefined rules and based at least in part on one or more of the component carrier information for the user equipment and the capability information for the user equipment, wherein:
the one or more predefined rules define a minimum number of component carriers that are configurable by the first network node and a minimum number of component carriers that are configurable by a second network node; and
the one or more processors configured to configure one or more component carriers at the user equipment comprise one or more processors configured to configure the minimum number of component carriers that are configurable by the first network node.

19. The first network node of claim 18, wherein:
the one or more predefined rules define a proportion of the maximum number of component carriers that the user equipment is configured to use for dual connectivity operation that are configurable by the first network node; and
the one or more processors configured to configure the one or more component carriers at the user equipment comprise one or more processors configured to configure one or more component carriers up to the predefined proportion of the maximum number of component carriers that the user equipment is configured to use for dual connectivity operation.

20. The first network node of claim 19, wherein:
the proportion of the maximum number of component carriers is a first proportion; and
the one or more predefined rules define a second proportion of the maximum number of component carriers that the user equipment is configured to use for dual connectivity operation that are configurable by the second network node.

21. The first network node of claim 18, wherein:
a total of the minimum number of component carriers that are configurable by the first network node and the minimum number of component carriers that are configurable by the second network node is less than the maximum number of component carriers that the user equipment is configured to use for dual connectivity operation;
the one or more predefined rules further comprise that the first network node has priority for component carriers to be configured in addition to the minimum number of component carriers that are configurable by the first network node and the minimum number of component carriers that are configurable by the second network node; and
the one or more processors are further configured to configure additional component carriers beyond the minimum number of component carriers.

22. The first network node of claim 18, wherein:
a total of the minimum number of component carriers that are configurable by the first network node and the minimum number of component carriers that are configurable by the second network node is less than the maximum number of component carriers that the user equipment is configured to use for dual connectivity operation;
the one or more predefined rules further comprise prioritizing component carriers to be configured in addition to the minimum number of component carriers that are configurable by the first network node and the minimum number of component carriers that are configurable by the second network node on a first come first serve basis; and
the one or more processors are further configured to configure additional component carriers beyond the minimum number of component carriers if the first network node requests that an additional component carrier be configured before the second network node.

23. The first network node of claim 18, wherein:
the one or more predefined rules define a number of component carriers that are assignable by the first network node and a number of component carriers that are assignable by the second network node; and
the one or more processors are further configured to assign each of the component carriers a priority level, wherein the user equipment is configured to accept or deconfigure each of the component carriers based at least in part on the priority level of the component carriers.

24. The first network node of claim 23, wherein the priority level of each of the component carriers is assigned based on one or more of:
a random assignment;
a frequency range of each component carrier;
a frequency band of each component carrier;
a load of each component carrier; and
a usage of each component carrier.

25. The first network node of claim 23, wherein:
the one or more predefined rules define a number of component carriers that are assignable by the first network node and a number of component carriers that are assignable by the second network node; and
component carriers in addition to the number of component carriers that are configurable by the first network node and the number of component carriers that are configurable by the second network node are configured at the user equipment according to the assigned priorities.

26. The first network node of claim 18, wherein the one or more processors are further configured to communicate, to the second network node, one or more component carrier configuration parameters, the one or more component carrier configuration parameters comprising one or more of:
- a maximum number of component carriers that the user equipment is configured to use for dual connectivity operation;
- a proportion of the maximum number of component carriers that are configurable by the first network node for the user equipment for dual connectivity operation;
- a proportion of the maximum number of component carriers that are configurable by the second network node for the user equipment for dual connectivity operation;
- a minimum number of component carriers that are assignable by the first network node;
- a minimum number of component carriers that are assignable by the second network node; and
- a priority level assigned to a particular component carrier.

27. The first network node of claim 18, wherein the one or more processors are further configured to receive, from the user equipment, one or more component carrier configuration parameters, the one or more component carrier configuration parameters comprising one or more of:
- a maximum number of component carriers that the user equipment is configured to use for dual connectivity operation;
- a proportion of the maximum number of component carriers that are configurable by the first network node for the user equipment for dual connectivity operation;
- a proportion of the maximum number of component carriers that are configurable by the second network node for the user equipment for dual connectivity operation;
- a minimum number of component carriers that are assignable by the first network node;
- a minimum number of component carriers that are assignable by the second network node; and
- a priority level assigned to a particular component carrier.

28. The first network node of claim 18, wherein the one or more processors are further configured to receive, from the second network node, one or more component carrier configuration parameters, the one or more component carrier configuration parameters comprising one or more of:
- a maximum number of component carriers that the user equipment is configured to use for dual connectivity operation;
- a proportion of the maximum number of component carriers that are configurable by the first network node for the user equipment for dual connectivity operation;
- a proportion of the maximum number of component carriers that are configurable by the second network node for the user equipment for dual connectivity operation;
- a minimum number of component carriers that are assignable by the first network node;
- a minimum number of component carriers that are assignable by the second network node; and
- a priority level assigned to a particular component carrier.

29. The first network node of claim 18, wherein the one or more processors are further configured to:
- communicate, to the second network node, a recommended value for a particular component carrier configuration parameter; and
- determine a common value for the particular component carrier configuration parameter based on a predefined rule.

30. The first network node of claim 18, wherein:
the first network node is a Master eNodeB (MeNB); and
the one or more processors are further configured to communicate one or more component carrier configuration parameters to the second network node, the second network node comprising a secondary eNodeB (SeNB).

31. The first network node of claim 18, wherein the one or more processors are further configured to receive one or more component carrier configuration parameters from a third network node.

32. The first network node of claim 18, wherein the one or more processors are further configured to communicate, to the second network node, the obtained component carrier information about one or more component carriers currently configured at the user equipment.

33. The first network node of claim 18, wherein the one or more processors are further configured to permit the second network node to configure component carriers at the user equipment.

34. The first network node of claim 18, wherein the one or more processors are further configured to receive an indication that a request to configure a component carrier at the user equipment has been denied.

* * * * *

UNITED STATES PATENT AND TRADEMARK OFFICE
CERTIFICATE OF CORRECTION

PATENT NO.         : 9,629,194 B2
APPLICATION NO.    : 14/708750
DATED              : April 18, 2017
INVENTOR(S)        : Rahman et al.

It is certified that error appears in the above-identified patent and that said Letters Patent is hereby corrected as shown below:

In the Specification

Column 1, Line 26, delete "RRC CONNECTED." and insert -- RRC_CONNECTED. --, therefor.

Column 9, Line 40, delete "embodiments." and insert -- embodiments; --, therefor.

Column 11, Line 42, delete "equipped" and insert -- equipment --, therefor.

Column 12, Line 59, delete "a may" and insert -- α may --, therefor.

Column 13, Line 57, delete "come," and insert -- come --, therefor.

Column 15, Line 1, delete "f3" and insert -- f0 --, therefor.

Column 15, Line 50, delete "a and" and insert -- α and --, therefor.

Column 16, Line 52, delete "115E" and insert -- 115B --, therefor.

Column 17, Line 62, delete "equipment" and insert -- equipment. --, therefor.

Column 22, Line 7, delete "FIG. 7 a" and insert -- FIG. 7 is a --, therefor.

Column 24, Line 12, delete "remote RF" and insert -- remote radio --, therefor.

Column 24, Line 14, delete "(MSR) radio" and insert -- (MSR) --, therefor.

Column 24, Lines 44-45, delete "core network nodes 130, radio network controllers 120, etc." and insert -- core network nodes or radio network controllers 120, etc. --, therefor.

Column 27, Line 31, delete "pSCell" and insert -- PSCell --, therefor.

Signed and Sealed this
Thirty-first Day of October, 2017

Joseph Matal
*Performing the Functions and Duties of the*
*Under Secretary of Commerce for Intellectual Property and*
*Director of the United States Patent and Trademark Office*

CERTIFICATE OF CORRECTION (continued)
U.S. Pat. No. 9,629,194 B2

Column 27, Line 46, delete "UMTS Absolute" and insert -- UTRA Absolute --, therefor.

Column 27, Line 58, delete "UARFCN UMTS ARFCN".

In the Claims

Column 29, Line 4, Claim 5, delete "claim 4," and insert -- claim 1, --, therefor.